US012740568B2

(12) United States Patent
Doshi et al.

(10) Patent No.: US 12,740,568 B2
(45) Date of Patent: Sep. 22, 2026

(54) PESTICIDAL COMPOSITION

(71) Applicants: Hiteshkumar Anilkant Doshi, Thane (IN); Rajiv Rathod, Vadodara (IN)

(72) Inventors: Hiteshkumar Anilkant Doshi, Thane (IN); Rajiv Rathod, Vadodara (IN)

(73) Assignee: SML Limited, Mumbai (IN)

( * ) Notice: Subject to any disclaimer, the term of this patent is extended or adjusted under 35 U.S.C. 154(b) by 245 days.

(21) Appl. No.: 18/682,831

(22) PCT Filed: Aug. 18, 2022

(86) PCT No.: PCT/IB2022/057750
§ 371 (c)(1),
(2) Date: Feb. 9, 2024

(87) PCT Pub. No.: WO2023/021461
PCT Pub. Date: Feb. 23, 2023

(65) Prior Publication Data

US 2025/0134108 A1 May 1, 2025

(30) Foreign Application Priority Data

Aug. 19, 2021 (IN) ............................ 202121037709

(51) Int. Cl.

| | |
|---|---|
| ***A01N 59/02*** | (2006.01) |
| ***A01N 43/56*** | (2006.01) |
| ***A01N 43/653*** | (2006.01) |
| ***A01P 3/00*** | (2006.01) |

(52) U.S. Cl.
CPC ............. *A01N 59/02* (2013.01); *A01N 43/56* (2013.01); *A01N 43/653* (2013.01); *A01P 3/00* (2021.08)

(58) Field of Classification Search
None
See application file for complete search history.

(56) References Cited

FOREIGN PATENT DOCUMENTS

| | | | | |
|---|---|---|---|---|
| WO | 2012016972 A1 | | 2/2012 | |
| WO | 2012101660 A1 | | 8/2012 | |
| WO | WO-2018162999 A1 | * | 9/2018 | ........... A01N 43/653 |
| WO | WO-2020021506 A1 | * | 1/2020 | ............... C05G 5/27 |

OTHER PUBLICATIONS

Written Opinion and International Search Report from PCT Application No. PCT/IB2022/057750 mailed Nov. 21, 2022.

* cited by examiner

*Primary Examiner* — Dominic Lazaro
(74) *Attorney, Agent, or Firm* — Vorys, Sater, Seymour and Pease LLP

(57) ABSTRACT

The invention particularly relates to a pesticidal composition comprising elemental sulphur in the range of 30% w/w to 90% w/w of the total composition; fluxapyroxad present in the range of 0.01% to 25% w/w of the total composition; and prothioconazole present in the range of 1% to 20% w/w of the total composition and at least one agrochemically acceptable excipient, wherein the composition has a particle size range of 0.1 to 50 microns. The present invention also relates to process of preparation of the pesticidal composition. The invention further relates to a method of controlling fungal disease, crop protection or improving the plant health and yield by treating a plant, plant propagation material, locus or parts thereof, a seed, seedling or surrounding soil with the pesticidal composition.

14 Claims, No Drawings

PESTICIDAL COMPOSITION

FIELD OF THE INVENTION

The present invention relates to a pesticidal combination comprising elemental sulphur, fluxapyroxad and prothioconazole. The present invention also relates to a pesticidal composition comprising elemental sulphur, fluxapyroxad, prothioconazole and at least one agrochemically acceptable excipient. More particularly, the present invention relates to a pesticidal composition comprising elemental sulphur in the range of 30% w/w to 90% w/w of the total composition; fluxapyroxad in the range of 0.01% w/w to 25% w/w of the total composition; prothioconazole in the range of 1% w/w to 20% w/w of the total composition and at least one agrochemically acceptable excipient, wherein the composition has a particle size range of 0.1 micron to 50 microns.

The invention further relates to a process for preparing the pesticidal composition.

The invention furthermore relates to a method of controlling fungal disease, crop protection or improving the plant health and yield by treating a plant, crop, plant propagation material, locus or parts thereof, a seed, seedling or surrounding soil with the pesticidal composition.

1. BACKGROUND OF THE INVENTION

In describing the embodiment of the invention, specific terminology is chosen for the sake of clarity. However, it is not intended that the invention be limited to the specific terms so selected and it is to be understood that each specific term includes all technical equivalents that operate in a similar manner to accomplish a similar purpose.

Use of agrochemicals, in particular chemical fungicides, for protection of crops against fungi and other pests has been an integral component of crop management. Current fungicides available in the market does not meet the modem-day crop protection requirements, as they:

- lack in providing broad spectrum of action,
- exhibit increased resistance among the pests due to the repeated and prolonged administration of the individual actives or known chemistries at higher dosages,
- lead to environmental pollution and soil toxicity due to leaching of fertilizers and pesticides in soil and groundwater.

In addition, the repeated use of the current pesticidal products also exhibits problems such as pest resurgence, secondary pest outbreak, residue related problems, toxic effect on human beings along with reduced yield.

Hence, there is a clear need for improved pesticidal products, in particular fungicides, which addresses the above drawbacks associated with the known chemistries.

Fluxapyroxad, a pyrazole-carboxamide fungicide, controls fungal growth by inhibiting the succinate dehydrogenase enzyme and exhibits a preventive and therapeutic action simultaneously.

Prothioconazole, a broad-spectrum triazole fungicide, acts as an ergosterol biosynthesis inhibitor and inhibits the demethylation of the precursors of sterols, lanosterol or 24-methylene dihydrogen in the fungus. Prothioconazole exhibits good systemic activity, and offers good protection with a long-lasting effect on pathogens.

The role of sulphur as a fertilizer and pesticide has been long known. Sulphur is considered as organic in nature and is largely available in its elemental form. The benefits of sulphur not only encompasses reduced dependency on use of chemicals as an effective mode of pest and disease control along with nutritional benefits but being organic in nature it is also environment friendly, increases crop yield, improves food safety, human, animal or plant health and quality of life. The use of sulphur as a fungicide, acaricide, miticide and nutrient is of special importance and has been long used as an environment friendly mode of farming practice.

Two-way combinations of actives namely fluxapyroxad with prothioconazole, and inpyrfluxam with sulphur for controlling pathogens and pests are described in the literature. However, the biological properties of these known combinations are not entirely satisfactory in the areas of pathogenic control, phytotoxicity, and environmental exposure, for example.

US20210084904 relates to pesticidal mixtures containing one or more succinate dehydrogenase inhibitors (SDHIs), preferably inpyrfluxam and one or more sulfur-containing compounds, preferably sulphur for controlling peanut leaf spot.

WO20120016972 relates to a fungicidal composition comprising fluxapyroxad and prothioconazole for controlling phytopathogenic fungi in corn.

WO2018162999 relates to fungicidal combinations comprising a multi-site contact fungicide, a succinate dehydrogenase inhibitor fungicide and a second systemic fungicide and a method using the same. WO'999 discusses thousands of possible three-way fungicidal combinations. WO'999 discloses that the fungicidal composition is effective in control of target pest due to the use of three-way combination.

However, these literatures are silent on the specific combination of elemental sulphur, fluxapyroxad and prothioconazole in a pesticidal effective amount with a specific particle size; and on the efficacy and the synergy of the said combination.

Thus, no fungicidal composition known in the art comprising of specific combination of sulphur, fluxapyroxad and prothioconazole which can be effectively used with broad spectrum pesticidal activity at lower dosage and address the drawbacks discussed above with the known compositions.

That need is solved according to the present invention by the provision of the present stable and improved pesticidal combination.

SUMMARY OF THE INVENTION

The present invention relates to a synergistic combination comprising elemental sulphur, fluxapyroxad and prothioconazole.

The present invention relates to a synergistic pesticidal composition comprising elemental sulphur, fluxapyroxad, prothioconazole and at least one agrochemically acceptable excipient.

The present invention relates to a pesticidal composition comprising elemental sulphur in the range of 30% w/w to 90% w/w of the total composition, fluxapyroxad in the range of 0.01% w/w to 25% w/w of the total composition, prothioconazole in the range of 1% w/w to 20% w/w of the total composition, and at least one agrochemically acceptable excipient, wherein the composition has a particle size range of 0.1 micron to 50 microns.

The present invention further relates to a process for preparation of the pesticidal composition comprising elemental sulphur in the range of 30% w/w to 90% w/w of the total composition; fluxapyroxad in the range of 0.01% w/w to 25% w/w of the total composition; prothioconazole in the range of 1% w/w to 20% w/w of the total composition and at least one agrochemically acceptable excipient, wherein the composition has a particle size range of 0.1 micron to 50 microns.

The present invention also relates to a method of controlling fungal disease, crop protection or improving the plant health and yield by treating a plant, crop, plant propagation material, locus or parts thereof, a seed, seedling or surrounding soil with the pesticidal composition comprising elemental sulphur, fluxapyroxad, prothioconazole and at least one agrochemically acceptable excipient.

4. DETAILED DESCRIPTION OF THE INVENTION

In describing the embodiment of the invention, specific terminology is chosen for the sake of clarity. However, it is not intended that the invention be limited to the specific terms so selected and it is to be understood that such specific terms include all technical equivalents that operate in a similar manner to accomplish a similar purpose. It is understood that any numerical range recited herein is intended to include all subranges subsumed. Also, unless denoted otherwise, percentage of components in a composition are presented as weight percent.

The terms "a" or "an", as used herein, are defined as one or more than one. The terms "including" and/or "having", as used herein, are defined as comprising (i.e., open language).

The term "Sulphur" used in the composition refers to elemental sulphur obtained through natural sources or synthetic sources. The term includes allotropes of elemental sulfur such as plastic (amorphous) sulfur, monoclinic sulfur, rhombic sulfur composed of S8 molecules, and other ring molecules such as S7 and 512. The term also comprises sulphur produced through processing and refining of petrochemicals. The term also comprises 'biosulfur'. The term also comprises elemental Sulphur produced through microbial processes.

Prothioconazole used in the present invention refers to prothioconazole or its salts or derivatives thereof.

The granules refer mainly to water dispersible granules, extruded granules or spheronised granules. As described herein, "GR" refers to extruded granules or spheronised granules. As described herein, "WG" or "WDG" refer to water dispersible granules.

As described herein, water dispersible granule is defined as a formulation which disperses or dissolves rapidly when added to water to give a fine particle suspension. Water-dispersible granules are formulated as small, easily measured granules by blending and agglomerating ground active ingredients together with surfactants and other formulation excipients which disperses into finer/primary particles upon addition to water.

According to the invention, the term liquid suspension encompasses "aqueous suspension" or aqueous dispersion" or "suspension concentrates (SC)" composition. Liquid suspension is defined as a composition wherein solid particles are dispersed or suspended in a liquid. The liquid as a vehicle is water and/or a water miscible solvent.

As defined herein, WP refers to a wettable powder, which is a powder formulation to be applied as a suspension after dispersion in water.

As defined herein, WS refers to a water dispersible powder for slurry seed treatment.

As defined herein, aqueous suspo-emulsion is essentially a mixture of water-insoluble active constituents dispersed in a water-based solution; where one (or more) of the active constituents is a solid, formulated as a suspension form (SC) and one (or more) of the actives is an oil, formulated as an emulsion in water (EW).

The present invention relates to a synergistic combination comprising elemental sulphur, fluxapyroxad and prothioconazole.

The present invention relates to a synergistic combination comprising elemental sulphur in the range of 30% w/w to 90% w/w of the total composition, fluxapyroxad in the range of 0.01% w/w to 25% w/w of the total composition, prothioconazole in the range of 1% w/w to 20% w/w of the total composition. The present invention relates to an improved and stable fungicidal composition comprising elemental sulphur in the range of 30% w/w to 90% w/w of the total composition, fluxapyroxad in the range of 0.01% w/w to 25% w/w of the total composition, prothioconazole in the range of 1% w/w to 20% w/w of the total composition, and at least one agrochemically acceptable excipient, wherein the composition has a particle size in the range of 0.1 micron to 50 microns.

The inventors of the present invention have surprisingly found that the combination comprising elemental sulphur, fluxapyroxad, prothioconazole demonstrated synergistic pesticidal activity compared to the activity of the individual active ingredient alone.

In addition to the synergistic effect of the composition of the present invention, the inventors surprisingly determined that the composition comprising elemental sulphur in the range of 30% w/w to 90% w/w of the total composition, fluxapyroxad in the range of 0.01% w/w to 25% w/w of the total composition, prothioconazole in the range of 1% w/w to 20% w/w of the total composition, and at least one agrochemical excipient in the form of solid, liquid, gel or paste provides excellent pest control and improves yield when the particles in the composition are present in the size range of 0.1 micron to 50 microns.

The inventors of the present invention surprisingly found that the presence of elemental sulphur in the composition of the present invention, not only demonstrates synergistic effect in terms of controlling fungi, but also additionally provides nutrition to the plant, thus showing a significant enhancement in the yield as well as other crop characteristics such as plant height, root length and improved foliage, as compared to the individual applications of sulphur, fluxapyroxad and prothioconazole.

Further, the inventors found that the composition of the present invention manifested significant efficacy when the elemental sulphur was loaded at a concentration of at least 30% w/w. It was also found that the presence of elemental sulphur in the composition at a concentration of at least 30% w/w not only aided in prolonging the pest resistance towards the other actives present in the composition i.e. prothioconazole and fluxapyroxad but also helped reducing the active dose of fungicides i.e. fluxapyroxad and prothioconazole.

Further, the composition of the present invention was found to not only provide an economical advantage to the farmers at large, but also provide an ecological advantage on account of higher loading of elemental sulphur, which being organic in nature, does not cause an adverse impact either to the environment or to the human population and further helps in reducing the active dose of chemical/synthetic pesticides used in the composition.

According to an embodiment, elemental sulphur is present in the range of 30% w/w to 90% w/w of the total composition. According to an embodiment, elemental sulphur is present in the range of 30% w/w to 80% w/w of the total composition. According to an embodiment, elemental sulphur is present in the range of 30% w/w to 70% w/w of the total composition. According to an embodiment, elemental sulphur is present in the range of 30% w/w to 60% w/w of the total composition. According to an embodiment, elemental sulphur is present in the range of 30% w/w to 50% w/w of the total composition. According to an embodiment, elemental sulphur is present in the range of 40% w/w to 90% w/w of the total composition. According to an embodiment, elemental sulphur is present in the range of 40% w/w to 80% w/w of the total composition. According to an embodiment, elemental sulphur is present in the range of 40% w/w to 70% w/w of the total composition. According to an embodiment, elemental sulphur is present in the range of 50% w/w to 90% w/w of the total composition. According to an embodiment, elemental sulphur is present in the range of 50% w/w to 80% w/w of the total composition. According to an embodiment, elemental sulphur is present in the range of 60% w/w to 90% w/w of the total composition.

According to an embodiment, fluxapyroxad is present in the range of 0.01% to 25% w/w of the total composition. According to an embodiment, fluxapyroxad is present in the range of 0.01% to 20% w/w of the total composition. According to an embodiment, fluxapyroxad is present in the range of 0.01% to 15% w/w of the total composition. According to an embodiment, fluxapyroxad is present in the range of 0.01% to 10% w/w of the total composition. According to an embodiment, fluxapyroxad is present in the range of 0.01% to 5% w/w of the total composition.

According to an embodiment, prothioconazole is present in the range of 1% to 20% w/w of the total composition. According to an embodiment, prothioconazole is present in the range of 1% to 15% w/w of the total composition. According to an embodiment, prothioconazole is present in the range of 1% to 10% w/w of the total composition.

According to an embodiment, the pesticidal composition is in the form of a solid, a liquid or a gel or a paste.

According to an embodiment, the liquid pesticidal composition is in the form of suspension concentrate (SC) or aqueous suspension or a liquid suspension, oil dispersion (OD), flowable concentrate (FC), seed dressing, suspo-emulsion (SE), suspension concentrate for seed treatment (FS), Ultra-Low-Volume (ULV).

According to an embodiment, the liquid pesticidal composition is preferably in the form of a suspension concentrate or aqueous suspension or a liquid suspension.

According to an embodiment, the solid pesticidal composition is in the form of powders, granules or dust.

According to an embodiment, the pesticidal composition is in the form of powders including wettable powders (WP), Water Dispersible powders for slurry seed treatment (WS), Dustable powder (DP), Powders for dry seed treatment (DS), water disintegrable tablet.

According to an embodiment, the pesticidal composition is in the form of granules including broadcast granules, pellets, extruded granules, water dispersible granules (WG), water disintegrable granules.

According to an embodiment, the pesticidal composition is preferably in the form of water dispersible granules.

According to an embodiment, the pesticidal composition in the form of water dispersible granules is in the size range of 0.05 mm to 3 mm. According to an embodiment, the pesticidal composition in the form of water dispersible granules is in the size range of 0.05 mm to 2.5 mm. According to an embodiment, the pesticidal composition in the form of water dispersible granules is in the size range of 0.05 mm to 2.0 mm. According to an embodiment, the pesticidal composition in the form of water dispersible granules is in the size range of 0.05 mm to 1.5 mm.

According to an embodiment, the pesticidal composition in the form of water dispersible granules or suspension concentrates can comprise particles in the size range of 0.1 micron to 50 microns. According to an embodiment, the pesticidal composition in the form of water dispersible granules can comprise particles in the size range of 0.1 micron to 40 microns. According to an embodiment, the pesticidal composition in the form of water dispersible granules can comprise particles in the size range of 0.1 micron to 30 microns. According to an embodiment, the pesticidal composition in the form of water dispersible granules can comprise particles in the size range of 0.1 micron to 25 microns. According to an embodiment, the pesticidal composition in the form of water dispersible granules can comprise particles in the size range of 0.1 micron to 20 microns.

According to an embodiment, the pesticidal composition comprises at least one agrochemically acceptable excipient.

According to a further embodiment, the agrochemically acceptable excipient is present in the range of from 0.1% w/w to 70% w/w of the total composition.

According to a further embodiment, the agrochemically acceptable excipient is present in the range of from 0.1% w/w to 60% w/w of the total composition.

According to a further embodiment, the agrochemically acceptable excipient is present in the range of from 0.1% w/w to 50% w/w of the total composition.

According to a further embodiment, the agrochemically acceptable excipient is present in the range of from 0.1% w/w to 40% w/w of the total composition.

According to a further embodiment, the agrochemically acceptable excipient is present in the range of from 0.1% w/w to 35% w/w of the total composition.

According to further embodiment, the agrochemically acceptable excipient comprises at least one of surfactants, wetting agents, dispersing agents, emulsifiers, binders or binding agents, disintegrating agents, fillers or carriers or diluents, coating agents, buffers or pH adjusters or neutralizing agents, antifoaming agents or defoamers, penetrants, ultraviolet absorbents, UV ray scattering agents, stabilizers, pigments, colorants, structuring agents, chelating or complexing or sequestering agents, thickeners, suspending agents or suspension aid agents or anticaking agents or anti-settling agents, viscosity modifiers or rheology modifiers, tackifiers, humectants, sticking agents, anti-freezing agent or freeze point depressants, solvents, preservatives or bactericides or anti-fungal agents or biocides or anti-microbial agents or antioxidants and mixtures thereof. However, those skilled in the art will appreciate that it is possible to utilize additional agrochemically acceptable excipients without departing from the scope of the present invention.

According to an embodiment, the pesticidal composition in the form of water dispersible or spheronised granules further comprises at least one agrochemical excipient which includes disintegrating agent, surfactant, binders or fillers or carriers or diluent, antifoaming agent, ultraviolet absorbents, UV ray scattering agents, anticaking agent or anti-settling or suspension aid or suspending agent, penetrating agent, sticking agent, tackifier, pigments, colorants, stabilizers, dispersing agents. However, those skilled in the art will appreciate that it is possible to utilize additional agrochemically acceptable excipients without departing from the scope of the present invention.

According to an embodiment, the liquid pesticidal composition further comprises at least one agrochemical excipient which includes at least one structuring agent, surfactant, humectants, water miscible solvents, suspending agents or suspension aid or anticaking agent or anti-settling, penetrating agent, sticking agents, ultraviolet absorbents, UV ray scattering agents, buffer or pH adjuster or neutralizing agent, stabilizer, antifreezing agent or freeze point depressants, antifoaming agents. However, those skilled in the art will appreciate that it is possible to utilize additional agrochemically acceptable excipients without departing from the scope of the present invention.

However, those skilled in the art will appreciate that it is possible to utilize additional agrochemically acceptable excipients without departing from the scope of the present invention. The agrochemically acceptable excipients are commercially manufactured and available through various companies.

According to an embodiment, the surfactants include one or more of emulsifiers, wetting agents and dispersing agents. According to an embodiment, the surfactants which are used in the pesticidal composition include one or more of anionic, cationic, non-ionic, amphoteric and polymeric surfactants.

The anionic surfactants include one or more of, but not limited to a salt of fatty acid, a benzoate, a polycarboxylate, a salt of alkylsulfuric acid ester, alkyl ether sulfates, an alkyl sulfate, an alkylarylsulfate, an alkyl diglycol ether sulfate, a salt of alcohol sulfuric acid ester, an alkyl sulfonate, an alkylaryl sulfonate, an aryl sulfonate, a lignin sulfonate, an alkyl diphenyl ether disulfonate, a polystyrene sulfonate, a salt of alkylphosphoric acid ester, an alkylaryl phosphate, a styrylaryl phosphate, sulfonate docusates, a salt of polyoxyethylene alkyl ether sulfuric acid ester, a polyoxyethylene-alkylaryl ether sulfate, alkyl sarcosinates, alpha olefin sulfonate sodium salt, alkyl benzene sulfonate or its salts, sodium lauroylsarcosinate, sulfosuccinates, polyacrylates, polyacrylates—free acid and sodium salt, salt of polyoxyethylenealkylaryl ether sulfuric acid ester, a polyoxyethylene alkyl ether phosphate, a salt of polyoxyethylenealkylaryl phosphoric acid ester, sulfosuccinates-mono and other diesters, phosphate esters, alkyl naphthalene sulfonate-isopropyl and butyl derivatives, alkyl ether sulfates-sodium and ammonium salts; alkyl aryl ether phosphates, ethylene oxides and its derivatives, a salt of polyoxyethylene aryl ether phosphoric acid ester, mono-alkyl sulphosuccinates, aromatic hydrocarbon sulphonates, 2-acrylamido-2-methylpropane sulfonic acid, ammonium laurylsulphate, ammonium perfluorononanoate, Docusate, Disodium cocoamphodiacetate, Magnesium laurethsulfate, Perfluorobutanesulfonic acid, Perfluorononanoic acid, carboxylates, Perfluorooctanesulfonic acid, Perfluorooctanoic acid, Phospholipid, Potassium lauryl sulfate, Soap, Soap substitute, Sodium alkyl sulfate, Sodium dodecyl sulfate, Sodium dodecylbenzenesulfonate, Sodium laurate, Sodium laurethsulfate, Sodium lauroylsarcosinate, Sodium myrethsulfate, Sodium nonanoyloxybenzenesulfonate, alkyl carboxylates, Sodium stearate, alpha olefin sulphonates, naphthalene sulfonate salts, alkyl naphthalene sulfonate fatty acid salts, naphthalene sulfonate condensates-sodium salt, fluoro carboxylate, fatty alcohol sulphates, alkyl naphthalene sulfonate condensates-sodium salt, a naphthalene sulfonic acid condensed with formaldehyde or a salt of alkylnaphthalene sulfonic acid condensed with formaldehyde; or salts, derivatives thereof.

The non-ionic surfactants include one or more of but not limited to polyol esters, polyol fatty acid esters, polyethoxylated esters, polyethoxylated alcohols, ethoxylated and propoxylated fatty alcohols, ethoxylated and propoxylated alcohols, Ethylene oxide (EO)/Propylene oxide (PO) copolymers; EO and PO block copolymers, di, tri-block copolymers; block copolymers of polyethylene glycol and polypropylene glycol, poloxamers, polysorbates, alkyl polysaccharides such as alkyl polyglycosidesand blends thereof, amine ethoxylates, sorbitan fatty acid ester, glycol and glycerol esters, glucosidyl alkyl ethers, sodium tallowate, polyoxyethylene glycol, sorbitan alkyl esters, sorbitan derivatives, fatty acid esters of sorbitan (Spans) and their ethoxylated derivatives (Tweens), and sucrose esters of fatty acids, Cetostearyl alcohol, Cetyl alcohol, Cocamide diethanolamine (DEA), Cocamide monoethanolamine (MEA), Decyl glucoside, Decylpolyglucose, Glycerol monostearate, Lauryl glucoside, Maltosides, Monolaurin, Narrow-range ethoxylate, Nonidet P-40, Nonoxynol-9, Nonoxynols, Octaethylene glycol monododecyl ether, N-Octyl beta-D-thioglucopyranoside, Octyl glucoside, Oleyl alcohol, PEG-10 sunflower glycerides, Pentaethylene glycol monododecyl ether, Polidocanol, Poloxamer, Poloxamer 407, Polyethoxylated tallow amine, Polyglycerol polyricinoleate, Polysorbate, Polysorbate 20, Polysorbate 80, Sorbitan, Sorbitanmonolaurate, Sorbitanmonostearate, Sorbitantristearate, Stearyl alcohol, Surfactin, glyceryl laureate, lauryl glucoside, nonylphenolpolyethoxyethanols, nonyl phenol polyglycol ether, castor oil ethoxylate, polyglycol ethers, polyadducts of ethylene oxide and propylene oxide, block copolymer of polyalkylene glycol ether and hydroxystearic acid, tributylphenoxypolyethoxy ethanol, octylphenoxypolyethoxy ethanol, etho-propoxylated-tristyrlphenols, ethoxylated alcohols, polyoxy ethylene sorbitan, fatty acid polyglyceride, a fatty acid alcohol polyglycol ether, acetylene glycol, acetylene alcohol, an oxyalkylene block polymer, polyoxyethylene alkyl ether, polyoxyethylenealkylaryl ether, a polyoxyethylenestyrylaryl ether, a polyoxyethylene glycol alkyl ether, polyethylene glycol, a polyoxyethylene fatty acid ester, a polyoxyethylenesorbitan fatty acid ester, a polyoxyethyleneglycerin fatty acid ester, Alcohol ethoxylates-C6 to C16/18 alcohols, linear and branched, Alcohol alkoxylates—various hydrophobes and EO/PO contents and ratios, Fatty acid esters-mono and diesters; lauric, stearic and oleic; Glycerol esters—with and without EO; lauric, stearic, cocoa and tall oil derived, Ethoxylated glycerine, Sorbitan esters—with and without EO; lauric, stearic and oleic based; mono and trimesters, Castor oil ethoxylates-5 to 200 moles EO; non-hydrogenated and hydrogenated, Block polymers, Amine oxides—ethoxylated and non-ethoxylated; alkyl dimethyl, Fatty amine ethoxylates—coco, tallow, stearyl, oleyl amines, a polyoxyethylene hydrogenated castor oil or a polyoxypropylene fatty acid ester; salts or derivatives thereof.

Amphoteric or Zwitterionic surfactants include one or more of, but not limited to one or more of betaine, coco and lauryl amidopropyl betaines, Coco Alkyl Dimethyl Amine Oxides, alkyl dimethyl betaines; C8 to C18, Alkyl dipropionates-sodium lauriminodipropionate, Cocoamidopropyl hydroxyl sulfobetaine, imidazolines, phospholipids phosphatidylserine, phosphatidylethanolamine, phosphatidylcholine, and sphingomyelins, Lauryl Dimethylamine Oxide, alkyl amphoacetates and proprionates, alkyl Ampho(di)acetates, and di-proprionates, lecithin and ethanolamine fatty amides; or salts, derivatives thereof.

Surfactants that are commercially available under the trademark but are not limited to one or more of Atlas G5000, TERMUL 5429, TERMUL 2510, ECOTERIC®, EULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, Cetomacrogol 1000, CHEMONIC OE-20, Triton N-101, Triton X-100, Tween 20, 40, 60, 65, 80, Span20, 40, 60, 80, 83, 85, 120, Brij@, Atlox 4912, TERMUL 3512, TERMUL 3015, TERMUL 5429, TERMUL 2510, ECOTERIC® T85, ECOTERIC® T20, TERIC 12A4, IGEPAL CA-630 and Isoceteth-20.

However, those skilled in the art will appreciate that it is possible to utilize other conventionally known surfactants (ionic or non ionic surfactants) without departing from the scope of the present invention. The surfactants are commercially manufactured and available through various companies.

According to an embodiment, the solvent is selected from water miscible solvents including but not limited to 1, 4-Dioxane, Ethylene glycol, N-Methyl-2-pyrrolidone, 1,3-Propanediol, 1,5-Pentanediol, Propylene glycol, Triethylene glycol, 1,2-Butanediol, 1,3-Butanediol, 1,4-Butanediol, Dimethylformamide, Dimethoxyethane, Dimethyloctanamide, glycerol, Dimethyldecanamide. However, those skilled in the art will appreciate that it is possible to utilize other water miscible solvents without departing from the scope of the present invention.

According to an embodiment, the disintegrating agents which are used in the agricultural composition include, but not limited to one or more of inorganic water soluble salts e.g. sodium chloride, nitrate salts; water soluble organic compounds such as agar, hydroxypropyl starch, carboxymethyl starch ether, tragacanth, gelatin, casein, microcrystalline cellulose, cross-linked sodium carboxymethyl cellulose, carboxymethyl cellulose, carboxymethyl cellulose calcium, sodium tripolyphosphate, sodium hexametaphosphate, metal stearates, a cellulose powder, dextrin, methacrylate copolymer, Polyplasdone® XL-10 (crosslinked polyvinylpyrrolidone), poly(vinylpyrrolidone), sulfonated styrene-isobutylene-maleic anhydride copolymer, salts of polyacrylates of methacrylates, starch-polyacrylonitrile graft copolymer, sodium or potassium bicarbonates/carbonates or their mixtures or salts with acids such as citric and fumaric acid or salts, derivatives thereof. However, those skilled in the art will appreciate that it is possible to utilize different disintegrating agents without departing from the scope of the present invention. The disintegrating agents are commercially manufactured and available through various companies.

According to an embodiment, the binding agents or binders which are used in the agricultural composition include, but not limited to one or more of proteins, gums, maltodextrin, carbohydrates such as monosaccharides, disaccharides, oligosaccharides and polysaccharides, complex organic substance, synthetic organic polymers or derivatives and combinations thereof. However, those skilled in the art will appreciate that it is possible to utilize different binding agents without departing from the scope of the present invention. The binding agents are commercially manufactured and available through various companies.

According to an embodiment, the carriers which are used in the agricultural composition include, but are not limited to one or more of solid carriers or fillers or diluents. According to another embodiment, the carriers include mineral carriers, plant carriers, synthetic carriers, water-soluble carriers. However, those skilled in the art will appreciate that it is possible to utilize different carriers without departing from the scope of the present invention. The carriers are commercially manufactured and available through various companies.

The solid carriers include natural minerals like clay such as china clay, acid clay, kaolin such as kaolinite, dickite, nacrite, and halloysite, serpentines such as chrysotile, lizardite, antigorite, and amesite, synthetic and diatomaceous silicas, montmorillonite minerals such as sodium montmorillonite, smectites, such as saponite, hectorite, sauconite, and hyderite, micas, such as pyrophyllite, talc, agalmatolite, muscovite, phengite, sericite, and illite, silicas such as cristobaliteand quartz, such as attapulgite and sepiolite; vermiculite, laponite, pumice, bauxite, hydrated aluminas, perlite, sodium bicarbonate, volclay, vermiculites, limestone, natural and synthetic silicates, charcoal, silicas, wet process silicas, dry process silicas, calcined products of wet process silicas, surface-modified silicas, mica, zeolite, diatomaceous earth, derivatives thereof; chalks (Omya®), fuller's earth, loess, mirabilite, white carbon, slaked lime, synthetic silicic acid, starch, modified starch (Pineflow, available from Matsutani Chemical industry Co., Ltd.), cellulose, plant carriers such as cellulose, chaff, wheat flour, wood flour, starch, rice bran, wheat bran, and soyabean flour, tobacco powder, a vegetable powder polyethylene, polypropylene, poly(vinylidene chloride), casein sodium, sucrose, salt cake, potassium pyrophosphate, sodium tripolyphosphate, maleic acid, fumaric acid, and malic acid or derivatives or mixtures thereof. Commercially available Silicates are Aerosil brands, Sipemat brands as Sipemat® 50S and CALFLO E, and kaolin 1777. However, those skilled in the art will appreciate that it is possible to utilize different solid carriers without departing from the scope of the present invention. The solid carriers are commercially manufactured and available through various companies.

According to an embodiment, the pigments and colorants are selected from but not limited to synthetic chemicals obtained from various manufacturers. The pigments and colorants can be water soluble or water insoluble, in the form of lakes. Dyes can be solvent dyes, acid dyes or basic dyes. Examples of such products include, but not limited to Agrocer Red 112, Agrocer Blue 153, Agrocer Green 007, Agrocer Yellow 001, Agrocer violet 023, Unisperse black 0058, Unisperse Red 3855, Pigmosol Agro Red 3785.

According to an embodiment, the antifoaming agents or defoamers which are used in the agricultural composition include, but not limited to one or more of silica, siloxane, silicon dioxide, polydimethyl siloxane, alkyl polyacrylates, ethylene oxide/propylene oxide copolymers, polyethylene glycol, Silicone oils and magnesium stearate or derivatives thereof. Preferred antifoaming agents include silicone emulsions (such as, e.g., Silikon® SRE, Wacker or Rhodorsil® from Rhodia), long-chain alcohols, fatty acids, fluoro-organic compounds. However, those skilled in the art will appreciate that it is possible to utilize other conventionally known antifoaming agents without departing from the scope of the present invention. The antifoaming agents are commercially manufactured and available through various companies.

According to an embodiment, the pH-adjusters or buffers or neutralizing agents s which are used in the agricultural composition include both acids and bases of the organic or inorganic type and mixtures thereof. According to further embodiment, pH-adjusters or buffers or neutralizing agents include, but not limited to one or more of organic acids, inorganic acids and alkali metal compounds or salts, derivatives thereof. According to an embodiment, the organic acids include, but not limited to one or more of citric, malic, adipic, fumaric, maleic, succinic, and tartaric acid, or salts, derivatives thereof; and the mono-, di-, or tribasic salts of these acids or derivatives thereof. Alkali metal compounds include, but not limited to one or more of hydroxides of alkali metals such as sodium hydroxide and potassium hydroxide, carbonates of alkali metals such as sodium carbonate, hydrogen carbonates of alkali metals such as sodium hydrogen carbonate and alkali metal phosphates such as sodium phosphate and mixtures thereof. According to an embodiment, the salts of inorganic acids include, but not limited to one or more of alkali metal salts such as lithium chloride, sodium chloride, potassium chloride, sodium nitrate, potassium nitrate, sodium sulfate, potassium sulfate, sodium monohydrogen phosphate, potassium monohydrogen phosphate, sodium dihydrogen phosphate, potassium dihydrogen phosphate and the like. Mixtures can also be used to create a pH-adjusters or buffers or neutralizing agents. However, those skilled in the art will appreciate that it is possible to utilize other conventionally known pH-adjusters or buffers or neutralizing agents without departing from the scope of the present invention. The pH-adjusters or buffers or neutralizing agents are commercially manufactured and available through various companies.

According to an embodiment, the spreading agents which are used in the agricultural composition include, but not limited to one or more of cellulose powder, dextrin, modified starch, crosslinked poly(vinylpyrrolidone), a copolymer of maleic acid with a styrene compound, a (meth)acrylic acid copolymer, a half ester of a polymer consisting of polyhydric alcohol with dicarboxylic anhydride, a water-soluble salt of polystyrene sulfonic acid, fatty acids, latex, aliphatic alcohols, vegetable oils such as cottonseed, or inorganic oils, petroleum distillates, modified trisiloxanes, polyglycol, polyethers, clatharates. However, those skilled in the art will appreciate that it is possible to utilize other conventionally known spreading agents without departing from the scope of the present invention. The spreading agents are commercially manufactured and available through various companies.

According to an embodiment, the sticking agents which are used in the agricultural composition include, but not limited to one or more of paraffin, a polyamide resin, polyacrylate, polyoxyethylene, wax, polyvinyl alkyl ether, an alkylphenol-formalin condensate, fatty acids, latex, aliphatic alcohols, vegetable oils such as cottonseed, or inorganic oils, petroleum distillates, modified trisiloxanes, polyglycol, polyethers, clatharates, a synthetic resin emulsion. However, those skilled in the art will appreciate that it is possible to utilize other conventionally known sticking agents without departing from the scope of the present invention. The sticking agents are commercially manufactured and available through various companies.

According to an embodiment, the stabilizers which are used in the agricultural composition include, but not limited to one or more of peroxide compounds such as hydrogen peroxide and organic peroxides, alkyl nitrites such as ethyl nitrite and alkyl glyoxylates such as ethyl glyoxylate, zeolite, antioxidants such as phenol compounds, phosphoric acid compounds, EDTA, dodium sulphites, citric acid, citrates and the like. However, those skilled in the art will appreciate that it is possible to utilize other conventionally known stabilizers without departing from the scope of the present invention. The stabilizers are commercially manufactured and available through various companies.

According to an embodiment, the preservatives which are used in the agricultural composition include but not limited to, one or more of bactericides, anti-fungal agents, biocides, anti-microbial agents, and antioxidant. Non limiting examples of preservatives include one or more of paraben, its esters and salts, propionic acid and its salts, 2,4-hexadienoic acid (sorbic acid) and its salt, formaldehyde and paraformaldehyde, 2-hydroxybiphenyl ether and its salts, inorganic sulfites and bisulfites, sodium iodate, chlorobutanol, dehydraacetic acid, formic acid, 1,6-bis(4-amidino-2-bromophenoxy)-n-hexane and its salts, 5-amino-1,3-bis(2-ethylhexyl)-5-methylhexahydropyrimidine, 5-bromo-5-nitro-1,3-dioxane, 2-bromo-2-nitropropane-1,3-diol, 2,4-dichlorobenzyl alcohol, N-(4-chlorophenyl)-N'-(3,4-dichlorophenyl) urea, 4-chloro-m-cresol, 2,4,4'-trichloro-2'-hydroxy diphenyl ether, 4-chloro-3,5-dimethyl phenol, 1,1'-methylene-bis(3-(1-hydroxy methyl-2,4-di-oximidazolidin-5-yl)urea), poly(hexamethylenediguanide) hydrochloride, 2-phenoxyethanol, hexamethylenetetramine, 1-(3-chloroallyl)-3,5,7-triaza-i-azonia-adamantane chloride, 1(4-chlorophenoxy)-1-(1H-imidazol-1-yl)-3,3-dimethyl-2-butanone, 1,3-bis(hydroxymethyl)-5,5-dimethyl-2,4-imidazolidinedione, benzyl alcohol, octopirox, 1,2-dibromo-2,4-dicyanobutane, 2,2'-methylenebis(6-bromo-4-chlorophenol), bromochlorophene, dichlorophene, 2-benzyl-4-chlorophenol, 2-chloroacetamide, chlorhexidine, chlorhexidine acetate, chlorhexidine gluconate, chlorhexidine hydrochloride, 1-phenoxypropan-2-ol, N-alkyl(C12-C22)trimethylammonium bromide and chloride, 4,4-dimethyl-1,3-oxazolidine, N-hydroxymethyl-N-(1,3-di(hydroxymethyl)-2,5-dioxoimidazolidin-4-yl)-N'-hydroxymethylurea, 1,6-bis(4-amidinophenoxy)-n-hexane and its salts, glutaraldehyde, 5-ethyl-1-aza-3,7-dioxabicyclo(3.3.0)octane, 3-(4-chlorophenoxy) propane-1,2-diol, Hyamine, alkyl(C8-C18)dimethylbenzyl ammonium chloride, alkyl(C8-C18)dimethylbenzylammonium bromide, alkyl(C8-C18)dimethylbenzylammonium-saccharinate, benzyl hemiformal, 3-iodo-2-propynyl butylcarbamate, sodium hydroxymethylaminoacetate, cetyltrimethylammonium bromide, cetylpyridinium chloride, and derivatives of 2H isothiazol-3-one (so-called isothiazolone derivatives) such as alkylisothiazolones (for example 2-methyl-2H-isothiazol-3-one, MIT; chloro-2-methyl-2H-isothiazol-3-one, CIT), benzoisothiazolones (for example 1,2-benzoisothiazol-3(2H)-one, BIT, commercially available as Proxel® types from ICI) or 2-methyl-4,5-trimethylene-2H-isothiazol-3-one (MTIT), C1-C4-alkyl para-hydroxybenzoate, an dichlorophene, Proxel® from ICI or Acticide® RS from Thor Chemie and Kathon® MK from Rohm & Haas, Bacto-100, thimerosal, Sodium Propinoate, Sodium Benzoate, Propyl Paraben, Propyl Paraben Sodum, Potassium Sorbate, Potassium Benzoate, Phenyl Mercuric Nitrate, Phenyl Etehyl Alcohol, Sodium, Ethylparaben, Methylparaben, Butylparaben, Bezyla Alcohol, Benzothonium Chloride, Cetylpyridinium Chloride, Benzalkonium Chloride, 1,2-benzothiazol-3-one, Preventol® (Lanxess®), Butylhydroxytoluene, potassium sorbate, iodine-containing organic compounds such as 3-bromo-2,3-diiodo-2-propenyl ethyl carbonate, 3-iodo-2-propynyl butyl carbamate, 2,3,3-triiodo allyl alcohol, and parachlorophenyl-3-iodopropargylformal; benzimidazole compounds and benzthiazole compounds such as 2-(4-thiazolyl)benzimidazole and 2-thiocyanomethylthiobenzo-thiazole; triazole compounds such as 1-(2-(2',4'-dichlorophenyl)-1,3-dioxolane-2-ylmethyl)-1H-1,2,4-triazole, 1-(2-(2',4'-dichloro phenyl)-4-propyl-1,3-dioxolane-2-ylmethyl)-1H-1,2,4-triazole, and α-(2-(4-chlorophenyl) ethyl)-α-(1,1-dimethyl ethyl)-1H-1,2,4-triazole-1-ethanol; and naturally occurring compounds such as 4-isopropyl tropolone (hinokitiol) and borax. Antioxidants includes but not limited to one or more of imidazole and imidazole derivatives (e.g. urocanic acid), 4,4'-thiobis-6-t-butyl-3-methylphenol, 2,6-di-t-butyl-p-cresol (BHT), penta erythrityl tetrakis[3-(3,5-di-t-butyl-4-hydroxyphenyl)] propionate; amine antioxidants such as N,N'-di-2-naphthylp-phenylenediamine; hydroquinoline antioxidants such as 2,5-di(t-amyl)hydroquinoline; phosphorus-containing anti-oxidants such as triphenyl phosphate, caro-tenoids, carotenes (e.g. α-carotene, β-carotene, lycopene) and derivatives thereof, lipoic acid and derivatives thereof (e.g. dihydro-lipoic acid), aurothioglucose, propylthiouracil and further thio compounds (e.g. thioglycerol, thiosorbitol, thioglycolic acid, thioredoxin, N-acetyl, methyl, ethyl, propyl, amyl, butyl, lauryl, palmitoyl, oleyl, γ-linoleyl, cholesteryl and glyceryl esters thereof), and salts thereof, dilaurylthiodipropionate, distearylthiodipropion-ate, thiodipropionic acid and derivatives thereof (esters, ethers, lipids, nucleotides, nucleosides and salts), and sulfoximine compounds (e.g. buthioninesulfoximi-nes, homocysteine sulfoximine, buthionine sulfones, penta-, hexa-, heptathioninesul-foximine) in very low tolerated doses (e.g. pmol/kg to pmol/kg), α-hydroxy acids (e.g. citric acid, lactic acid, malic acid), humic acids, gallic esters (e.g. propyl, octyl and dodecyl gallate), unsaturated fatty acids and derivatives, hydroquinone and derivatives thereof (e.g. arbutin), ubiquinone and ubiquinol, and derivatives thereof, ascorbyl palmitate, stearate, di-palmitate, acetate, Mg ascorbyl phosphates, disodiumascorbyl phosphate and sulfate, potassium ascorbyltocopheryl phosphate, isoascorbic acid and derivatives thereof, the coniferyl benzoate of benzoin resin, rutin, rutinic acid and derivatives thereof, disodium rutinyldisulfate, dibutylhydroxytoluene, 4,4-thiobis-6-tert-butyl-3-methylphenol, butylhydroxy anisole, p-octylphenol, mono-(di- or tri-) methyl benzylphenol, 2,6-tert-butyl-4-methylphenol, pentaerythritol-tetrakis 3-(3,5-di-tert-butyl-4-hydroxyphenyl)propionate, butylhydroxyanisol, nordihydroguaiacic acid, nordihydroguaiaretic acid, trihydroxybutyrophenone, uric acid and derivatives thereof, mannose and derivatives thereof, selenium and selenium derivatives (e.g. selenomethionine), stilbenes and stilbene derivatives (e.g. stilbene oxide, trans-stilbene oxide). However, those skilled in the art will appreciate that it is possible to utilize other conventionally known preservatives without departing from the scope of the present invention. The preservatives are commercially manufactured and available through various companies.

According to an embodiment, the structuring agents which are used in the agricultural composition include, but not limited to one or more of thickeners, viscosity modifiers, tackifiers, suspension aids, rheological modifiers or anti-settling agents. A structuring agent prevents sedimentation of the active ingredient particles after prolonged storage.

According to an embodiment, the structuring agents which are used in the aqueous suspension composition include, but not limited to one or more polymers such as polyacrylics, polyacrylamides, polysaccharides, hydrophobically modified cellulose derivatives, co-polymers of cellulose derivatives, carboxyvinyl or polyvinyl pyrrolidones, polyethylenes, polyethylene oxide, polyvinyl alcohol and derivatives; clays such as bentonite clays, kaolin, smectite, attapulgites, attaclays with high surface area silica and natural gums such as guar gum, xanthan gum, gum arabic, gum tragacanth, rhamsan gum, locust bean gum, carageenan, welan gum, veegum, gelatin, dextrin, collagen; polyacrylic acids and their sodium salts; the polyglycol ethers of fatty alcohols and polyethylene oxide or polypropylene oxide condensation products and mixtures thereof and include ethoxylated alkyl phenols (also designated in the art as alkylaryl polyether alcohols); ethoxylated aliphatic alcohols (or alkyl polyether alcohols); ethoxylated fatty acids (or polyoxyethylene fatty acid esters); ethoxylatedanhydrosorbitol esters (or polyethylene sorbitan fatty acid esters), long chain amine and cyclic amine oxides which are nonionic in basic solutions; long chain tertiary phosphine oxides; and long chain dialkyl sulfoxides, fumed silica, mixture of fumed silica and fumed aluminium oxide, swellable polymers, polyamides or its derivatives; polyols such as glycerine, poly(vinyl acetate), sodium polyacrylate, poly(ethylene glycol), phospholipid (for example, cephalin, and the like); stachyose, fructo-oligosaccharides, amylose, pectins, alginates, hydrocolloids and mixtures thereof. Also, celluloses such as hemicellulose, carboxymethylcellulose, ethylcellulose, hydroxyethylcellulose, hydroxy-methyl ethyl cellulose, hydroxyl ethyl propyl cellulose, methylhydroxyethylcellulose, methylcellulose; starches such, starch acetates, starch hydroxyethyl ethers, ionic starches, long-chain alkyl starches, dextrins, maltodextrin, corn starch, amine starches, phosphates starches, and dialdehyde starches; plant starches such as com starch and potato starch; other carbohydrates such as pectin, dextrin, amylopectin, xylan, glycogen, agar, gluten, alginic acid, phycocolloids, or derivatives thereof. However, those skilled in the art will appreciate that it is possible to utilize other conventionally known structuring agents without departing from the scope of the present invention.

Preferred structuring agents include one or more of xanthan gum, guar gum, aluminum silicate, methyl cellulose and its derivatives, polysaccharide, alkaline earth metal silicate, and polyvinyl alcohol. The structuring agents are commercially manufactured and available through various companies.

According to an embodiment, the anticaking agents or anti-settling agent or suspending agents used include one or more of, but not limited to polysaccharides such as starch, mannose, galactose, cellulose derivatives such as sodium carboxymethyl cellulose, hydroxyethyl cellulose, hydroxypropyl cellulose, hydroxypropylmethyl cellulose and methyl cellulose; gums such as agar, carrageenan, alginates, arabic, tragacanth, karaya, ghatti, guar, dextran, starches including pregelatinized and modified starches, poly(vinylpyrrolidone), fumed silica (white carbon), ester gum, a petroleum resin, Foammaster® Soap L sodium stearate, Brij® 700 polyoxyethylene (100) stearylether, Aerosol® OT-B sodium dioctyl sulfosuccinate, Silwet® L-77 silicone-polyether copolymer, sodium acetate, sodium metasilicate, sodium alkylsulfosuccinates, salts or derivatives thereof. However, those skilled in the art will appreciate that it is possible to utilize different anti caking agents without departing from the scope of the present invention. anticaking agents or anti-settling agent or suspending agents or suspension aids are commercially manufactured and available through various companies.

According to an embodiment, the antifreezing agents or freezing point depressants used in the aqueous suspension composition include, but are not limited to one or more of polyhydric alcohols such as ethylene glycol, diethylene glycol, dipropylene glycol, propylene glycol, butyrolactone, N,N-dimethyl-formamide, glycerol, monohydric or polyhydric alcohols, glycol ethers, glycol ethers, glycol monoethers such as the methyl, ethyl, propyl and butyl ether of ethylene glycol, diethylene glycol, propylene glycol and dipropylene glycol, glycol diethers such as methyl and ethyl diethers of ethylene glycol, diethylene glycol and dipropyleneglycol. or urea, glycerol, isopropanol, propylene glycol monomethyl ether, di- or tripropylene glycol monomethyl ether or cyclohexanol, carbohydrates such as glucose, mannose, fructose, galactose, sucrose, lactose, maltose, xylose, arabinose, sorbitol, mannitol, trehalose, raffinose or derivatives thereof. However, those skilled in the art will appreciate that it is possible to utilize different antifreezing agents without departing from the scope of the present invention. The antifreezing agents are commercially manufactured and available through various companies. According to an embodiment, the antifreezing agent is present an amount of from 0.1% to 20% w/w of the total composition.

According to an embodiment, the penetrant which is used in the composition include, but not limited to one or more of alcohol, glycol, glycol ether, ester, amine, alkanolamine, amine oxide, quaternary ammonium compound, triglyceride, fatty acid ester, fatty acid ether, N-methyl pyrrolidone, dimethyl formamide, dimethyl acetamide, or dimethyl sulfoxide, polyoxyethylene trimethylol propane monooleate, polyoxyethylene trimethylol propanedioleate, polyoxyethylene trimethylol propanetrioleate, polyoxyethylene sorbitan monooleate, polyoxyethylene sorbitol hexaoleate. However, those skilled in the art will appreciate that it is possible to utilize different penetrants without departing from the scope of the present invention.

According to an embodiment, the ultraviolet absorbent is selected from, but not limited to one or more of 2-(2'-hydroxy-5'-methylphenyl) benzotriazole, 2-ethoxy-2'-ethyloxazalic acid bisanilide, succinic acid dimethyl-1-(2-hydroxyethyl)-4-hydroxy-2,2,6,6-tetramethylpiperidine polycondensate, benzotriazole compounds such as 2-(2'-hydroxy-5'-methylphenyl)benzotriazole and 2-(2'-hydroxy-4'-n-octoxyphenyl)benzotriazole; benzophenone compounds such as 2-hydroxy-4-methoxybenzophenone and 2-hydroxy-4-n-octoxybenzophenone; salicylic acid compounds such as phenyl salicylate and p-t-butylphenyl salicylate; 2-ethylhexyl 2-cyano-3,3-diphenyl acrylate, 2-ethoxy-2'-ethyl oxalic bisanilide, and dimethyl succinate-1-(2-hydroxyethyl)-4-hydroxy-2,2,6,6-tetramethyl piperidine poly-condensate or derivatives or the like. However, those skilled in the art will appreciate that it is possible to utilize different ultraviolet absorbents, without departing from the scope of the present invention. Such ultraviolet absorbents are commercially manufactured and available through various companies.

According to an embodiment, the UV ray scattering agents include, but not limited to titanium dioxide or the like may be used. However, those skilled in the art will appreciate that it is possible to utilize different UV ray scattering agents or mixtures thereof without departing from the scope of the present invention. Such UV ray scattering agents are commercially manufactured and available through various companies.

According to an embodiment, the humectant is selected from, but not limited to one or more of polyoxyethylene/polyoxypropylene copolymers, particularly block copolymers, such as the Synperonic PE series of copolymers available from Unigema or salts, derivatives thereof. Other humectants are propylene glycol, monoethylene glycol, hexylene glycol, butylene glycol, ethylene glycol, diethylene glycol, poly (ethylene glycol), poly (propylene glycol), glycerol and the like; polyhydric alcohol or derivatives thereof. Also, other humectants include aloe vera gel, alpha hydroxyl acids such as lactic acid and salts thereof, albumin, glyceryl triacetate, honey, calcium chloride, etc. The non-ionic surfactants mentioned above also act as humectants. However, those skilled in the art will appreciate that it is possible to utilize other conventionally known humectants without departing from the scope of the present invention. The humectants are commercially manufactured and available through various companies.

According to an embodiment, the pesticidal composition includes at least one further active ingredient selected from one or more of pesticidal active ingredients, fertilizers, micronutrients, macronutrients, biostimulants, organic acids, plant growth regulators, algae or mixtures thereof.

According to a further embodiment, the pesticidal active is one or more of insecticides, fungicides, herbicides, miticides, acaricides, nematicides, pheromones, algicides, antifeedants, avicides, bactericides, bird repellents, biopesticides, insect repellents, ovicides, rodenticides, etc. However, those skilled in the art will appreciate that it is possible to utilize other active ingredients without departing from the scope of the present invention.

It has been surprisingly found that the pesticidal composition of the present invention has enhanced and improved physical properties of dispersibility, suspensibility, wettability, viscosity, pourability, provides ease of handling and also reduces the loss of material while handling the product at the time of packaging as well as during field application.

Wettability is the condition or the state of being wettable and is defined as the degree to which a solid is wetted by a liquid, measured by the force of adhesion between the solid and liquid phases. The wettability of the granular composition is measured using the Standard CIPAC Test MT-53 which describes a procedure for the determination of the time of complete wetting of wettable formulations. A weighed amount of the granular composition is dropped on water in a beaker from a specified height and the time for complete wetting was determined. According to another embodiment, the pesticidal composition in the form of water dispersible granules or spheronised granules has wettability of less than 2 minutes. According to another embodiment, the pesticidal composition has wettability of less than 1 minute. According to another embodiment, the pesticidal composition has wettability of less than 30 seconds. According to another embodiment, the pesticidal composition has wettability of less than 15 seconds.

The spheronised granular composition is formulated in a manner such that it is imparted with sufficient hardness which prevents the granules from crumbling during storage and transportation. The hardness exhibited by the granules is estimated by hardness testers such as the ones provided by Shimadzu, Brinell Hardness (AKB-3000 Model), Mecmesin, Agilent, Vinsyst, Ametek and Rockwell. According to an embodiment, the hardness exhibited by the granules is less than 100 Newton. According to an embodiment, the hardness exhibited by the granules is less than 90 Newton. According to an embodiment, the hardness exhibited by the granules is less than 80 Newton. According to an embodiment, the hardness exhibited by the granules is less than 70 Newton. According to an embodiment, the hardness exhibited by the granules is less than 60 Newton. According to an embodiment, the hardness exhibited by the granules is less than 50 Newton.

According to an embodiment, the pesticidal composition in the form of water dispersible granule or liquid suspension passes the wet sieve retention test. The test is used to determine the amount of non-dispersible material in formulations that are applied as dispersions in water. The wet sieve retention value of the agrochemical composition in the form of liquid suspension and granules is measured by using the Standard CIPAC Test MT-185 which describes a procedure for measuring the amount of material retained on the sieve. A sample of the formulation is dispersed in water and the suspension formed is transferred to a sieve and washed. The amount of the material retained on the sieve is determined by drying and weighing According to an embodiment, the pesticidal composition in the form of water dispersible granule or liquid suspension has a wet sieve retention value on a 75-micron sieve of less than 0.5%. According to an embodiment, the pesticidal composition has a wet sieve retention value on a 75-micron sieve of less than 0.2%. According to an embodiment, the pesticidal composition has a wet sieve retention value on a 75-micron sieve of less than 0.1%. The wet sieve retention value of less than 0.5% indicate that the pesticidal composition helps in easy application of the formulation preventing clogging of the nozzles or filter equipment.

According to an embodiment, the pesticidal composition in the form of liquid suspension does not sediment or settle on storage and is easily pourable. This property is measured in terms of viscosity of the fluid which is a measure of its resistance to gradual deformation by shear stress or tensile stress.

According to an embodiment, viscosity of the liquid composition is determined as per CIPAC MT-192. A sample is transferred to a standard measuring system. The measurement is carried out under different shear conditions and the apparent viscosities are determined. During the test, the temperature of the liquid is kept constant.

According to an embodiment, the pesticidal composition has a viscosity at 25° C. of about 10 cps to about 3000 cps. According to an embodiment, the pesticidal composition has a viscosity at 25° C. of about 10 cps to about 2500 cps. According to an embodiment, the pesticidal composition has a viscosity at 25° C. of about 10 cps to about 2000 cps. According to an embodiment, the pesticidal composition has a viscosity at 25° C. of about 10 cps to about 1500 cps. According to an embodiment, the pesticidal composition has a viscosity at 25° C. of about 10 cps to about 1200 cps. According to an embodiment, the pesticidal composition has viscosity at 25° C. of about 10 cps to about 500 cps. According to an embodiment, the pesticidal composition has a viscosity at 25° C. of about less than 500 cps. According to an embodiment, the pesticidal composition has viscosity at 25° C. of about 10 cps to about 400 cps. According to an embodiment, the pesticidal composition has viscosity at 25° C. of about 10 cps to about 300 cps.

According to an embodiment, the liquid suspension composition of the present invention is easily pourable. The pourability is the measure of percent of residue.

According to an embodiment, the pourability of the pesticidal composition is determined as per CIPAC MT-148.1 by allowing the liquid suspension to stand for 24-hour and the amount remaining in the container after a standardized pouring procedure is determined. The container is rinsed and the amount then remaining is determined and the maximum residue in percent is calculated. According to a further embodiment, the pourability of the pesticidal composition is less than 5% residue. According to further embodiment, the pourability of the pesticidal composition is preferably less than 2.5% residue. According to further embodiment, the pourability of the pesticidal composition is more preferably less than 2.0% residue.

Dispersibility of the pesticidal composition in the form of water dispersible or spheronised granule is a measure of percent dispersion. Dispersibility is calculated by the minimum percent dispersion. Dispersibility is defined as the ability of the granules to disperse upon addition to a liquid such as water or a solvent. Dispersibility of the granular composition of the present application, was determined as per the standard CIPAC test, MT 174. A known amount of the granular composition was added to a defined volume of water and mixed by stirring to form a suspension. After standing for a short period, the top nine-tenths are drawn off and the remaining tenth dried and determined gravimetrically. The method is virtually a shortened test of suspensibility and is appropriate for establishing the ease with which the granular composition dispersed uniformly in water.

According to an embodiment, the pesticidal composition has a dispersibility of at least 30%. According to an embodiment, the pesticidal composition has a dispersibility of at least 40%. According to an embodiment, the pesticidal composition has a dispersibility of at least 50%. According to an embodiment, the pesticidal composition has a dispersibility of at least 60%. According to an embodiment, the pesticidal composition has a dispersibility of at least 70%. According to an embodiment, the pesticidal composition has a dispersibility of at least 80%. According to an embodiment, the pesticidal composition has a dispersibility of at least 90%. According to an embodiment, the pesticidal composition has a dispersibility of at least 99%. According to an embodiment, the pesticidal composition has a dispersibility of 100%.

According to an embodiment, the pesticidal composition in the form of water dispersible granule exhibits almost instantaneous dispersion.

According to an embodiment, the pesticidal composition in the form of spheronised granule makes the actives available instantaneously and also over a longer period which may extend throughout the crop cycle, providing an immediate and sustained release of actives eventually strengthening and protecting the crop at each and every stage of the crop cycle.

According to an embodiment, the pesticidal composition in the form of water dispersible granules, liquid suspension exhibits good suspensibility. Suspensibility is defined as the amount of active ingredient suspended after a given time in a column of liquid, of stated height, expressed as a percentage of the amount of active ingredient in the original suspension. The water dispersible granules is tested for suspensibility as per the CIPAC Handbook, "MT 184 Test for Suspensibility" whereby a suspension of known concentration of the composition in CIPAC Standard Water was prepared and placed in a prescribed measuring cylinder at a constant temperature, and allowed to remain undisturbed for a specified time. The top 9/10ths were drawn off and the remaining 1/10th was then assayed chemically, gravimetrically, or by solvent extraction, and the suspensibility was calculated.

The suspensibility of the liquid suspension is the amount of active ingredient suspended after a given time in a column of liquid, of stated height, expressed as a percentage of the amount of active ingredient in the original suspension. The suspensibility of liquid suspension concentrate is determined as per CIPAC MT-161 by preparing 250 ml of diluted suspension, allowing it to stand in a measuring cylinder under defined conditions, and removing the top nine-tenths. The remaining tenth is then assayed chemically, gravimetrically or by solvent extraction, and the suspensibility is calculated.

According to an embodiment, the pesticidal composition has a suspensibility of at least 30%. According to an embodiment, the pesticidal composition has suspensibility of at least 40%. According to an embodiment, the pesticidal composition has a suspensibility of at least 50%. According to an embodiment, the pesticidal composition has a suspensibility of at least 60%. According to an embodiment, the pesticidal composition has a suspensibility of at least 70%. According to an embodiment, the pesticidal composition has a suspensibility of at least 80%. According to an embodiment, the pesticidal composition has a suspensibility of at least 90%. According to an embodiment, the pesticidal composition has a suspensibility of at least 99%. According to an embodiment, the pesticidal composition has a suspensibility of 100%.

According to an embodiment, the pesticidal composition in the form of water dispersible granule or spheronised granule, liquid suspension demonstrates superior stability in terms of suspensibility under accelerated storage condition (ATS). According to an embodiment, the pesticidal composition demonstrates suspensibility of more than 90% under ATS. According to an embodiment, the pesticidal composition demonstrates suspensibility of more than 80% under ATS. According to an embodiment, the pesticidal composition demonstrates suspensibility of more than 70% under ATS. According to an embodiment, the pesticidal composition demonstrates suspensibility of more than 60% under ATS. According to an embodiment, the pesticidal composition demonstrates suspensibility of more than 50% under ATS. According to an embodiment, the pesticidal composition demonstrates suspensibility of more than 40% under ATS. According to an embodiment, the pesticidal composition demonstrates suspensibility of more than 30% under ATS.

According to an embodiment, the pesticidal composition demonstrates dispersibility of more than 90% under ATS. According to an embodiment, the pesticidal composition demonstrates dispersibility of more than 80% under ATS. According to an embodiment, the pesticidal composition demonstrates dispersibility of more than 70% under ATS. According to an embodiment, the pesticidal composition demonstrates dispersibility of more than 60% under ATS. According to an embodiment, the pesticidal composition demonstrates dispersibility of more than 50% under ATS. According to an embodiment, the pesticidal composition demonstrates dispersibility of more than 40% under ATS. According to an embodiment, the pesticidal composition demonstrates dispersibility of more than 30% under ATS.

According to an embodiment, the pesticidal composition demonstrates superior stability towards heat, light, temperature and caking. The composition does not form a hard cake and exhibits enhanced stability even at extended storage under higher temperatures which in turn results in superior field performance. According to further embodiment, the stability exhibited by the pesticidal composition is at least 3 years. According to further embodiment, the stability exhibited by the pesticidal composition is at least 2 years. According to further embodiment, the stability exhibited by the pesticidal composition is at least 1 year. According to further embodiment, the stability exhibited by the pesticidal composition is at least 6 months.

According to an embodiment, the present invention relates to a process for preparing pesticidal composition of the present invention comprising elemental sulphur in the range of 30% w/w to 90% w/w of the total composition; fluxapyroxad in the range of 0.01% w/w to 25% w/w of the total composition; prothioconazole in the range of 1% w/w to 20% w/w of the total composition and at least one agrochemically acceptable excipient, wherein the composition has particles in the size range of 0.1 micron to 50 microns.

According to a further embodiment the present invention relates to a process for preparing pesticidal composition in the form of water dispersible granules, spheronised granules, liquid suspension, wettable powder, suspo-emulsion, water dispersible powder for seed coating (WS), and suspension concentrate for seed coating (FS).

According to further embodiment, the pesticidal composition in the form of water dispersible granules or spheronised granules, is made by various techniques such as spray drying, fluidized bed granulation, disc pelletization, pan granulation, pin agglomerator, spheronizer, freeze drying or combinations. The granules can also be extruded through the extruded to obtain extruded granules.

The invention also relates to a process for preparing the pesticidal composition in the form of water dispersible granules, the process comprising: a) milling blend of elemental sulphur, fluxapyroxad and prothioconazole with at least one agrochemical excipient to obtain a slurry or wet mix, wherein the particles are in the size range of 0.1 to 50 microns and b) drying the wet mix, sieving the dried mix remove the undersized and oversized granules to obtain water dispersible granules; wherein the granules of the composition comprise of granules in size range of 0.05 mm to 3 mm.

The invention also relates to a process for preparing the granular pesticidal composition, the process comprising:

a) milling blend of elemental sulphur, fluxapyroxad and prothioconazole with at least one agrochemical excipient to obtain a slurry or wet mix, wherein the particles are in the size range of 0.1 to 50 microns;
b) drying the wet mix to obtain dried mix; and
c) water is added to the dried mix and blended to obtain a dough or paste, which is then extruded through an extruder to obtain the extruded granules in a size range of 0.05 mm to 6 mm; or agglomerating the wet mix or dried mix obtained in step (b) in an agglomerator to obtain spheronised granular composition in a size range of 0.05 mm to 6 mm.

The wet mix obtained is dried, for instance in a spray dryer, fluid bed dryer or any suitable granulating equipment, followed by sieving to remove the undersized and oversized granules to obtain granules.

The invention relates to a process for preparing a wettable powder (WP) or 'wettable powder for seed coat (WS)' composition, wherein the process involves mixing effective amount of fluxapyroxad with required diluents and inert ingredients to obtain a first mixture. The process involves mixing effective amount of prothioconazole with required diluents and inert ingredients to obtain a second mixture. Elemental sulphur is then mixed with the surfactants to obtain a third mixture. The three mixtures are then mixed using a suitable mass mixer for 30 minutes and passed through an air jet mill to obtain a wettable powder composition with the desired particle size range of 0.1 micron to 50 microns. Alternatively, the wettable powder composition is prepared by mixing effective amount of fluxapyroxad, prothioconazole, Elemental sulphur with required diluents and inert ingredients using a suitable mass mixer for 30 minutes and then passed through an air jet mill to obtain a wettable powder composition with the desired particle size range of 0.1 micron to 50 microns.

The invention relates to a process for preparing the liquid suspension or 'Suspension concentrate for seed treatment (FS)' composition, the process comprising: homogenizing mixture of elemental sulphur in the range of 30% w/w to 90% w/w of the total composition; fluxapyroxad in the range of 0.01% w/w to 25% w/w of the total composition; prothioconazole in the range of 1% w/w to 20% w/w of the total composition and at least one agrochemically acceptable excipient to obtain a suspension; and wet milling the obtained suspension to provide composition with a particle size range of 0.1 micron to 50 microns.

The process of preparing the liquid suspension, involves homogenization of one or more of excipients by feeding them into a vessel provided with stirring facilities. Elemental sulphur, fluxapyroxad and prothioconazole are added to the homogenized blend and stirred continuously for about 5 to 10 minutes until the total mixture becomes homogeneous. Subsequently, the suspension obtained is passed through the wet mill to obtain a desired particle size in the range of 0.1 to 50 microns. Then, requisite quantity of the structuring agent is added to the obtained suspension, under continuous homogenization. However, those skilled in the art will appreciate that it is possible to modify or alter or change the process or process parameters to obtain liquid suspension composition without departing from the scope of the present invention.

The invention relates to a process for preparation of a suspoemulsion pesticidal composition, the process comprising dissolving wetting agent and dispersing agents in water to obtain a mixture followed by addition of humectant, antifoam agent, if required, elemental sulphur and fluxapyroxad to obtain a homogenized suspension, which is further milled to obtain desired particle size (First fraction). Dissolve prothioconazole in an oil or a solvent, followed by addition of surfactant to prepare a concentrated emulsion with required agrochemical excipients to obtain a second fraction. The two fractions obtained are then mixed using a homogenizer for 30 minutes to obtain the suspoemulsion composition with the desired particle size of 0.1 to 50 microns.

According to an embodiment, the composition of the present invention is at least one of a pesticide composition, a crop protection composition, a crop strengthener composition, a yield enhancer composition.

According to an embodiment, the invention also relates to a method of controlling fungal disease, crop protection or improving the plant health and yield by treating a plant, plant propagation material, locus or parts thereof, a seed, seedling or surrounding soil with the pesticidal composition comprising elemental sulphur in the range of 30% w/w to 90% w/w of the total composition; fluxapyroxad in the range of 0.01% w/w to 25% w/w of the total composition; prothioconazole in the range of 1% w/w to 20% w/w of the total composition and at least one agrochemically acceptable excipient. The composition may be sprayed directly to the plant, such as its foliage or applied to the plant propagation material, before it is sown or planted, or to the locus thereof.

The composition is applied through a variety of methods. Methods of applying to the soil include any suitable method, which ensures that the composition penetrates the soil, for example nursery tray application, in furrow application, soil drenching, soil injection, drip irrigation, sprinkler irrigation, seed treatment, seed painting and such other methods. The composition also is applied in the form of a foliar spray.

The rates of application or the dosage of the composition depends on the type of use, the type of crops, or the specific active ingredients in the composition but is such that the pesticidal active ingredient, is in an effective amount to provide the desired action (such as crop protection, crop yield).

It was observed that the composition of the present invention provides good control on fungal pest as compared to application of individual actives. Further such composition helps in improving the crop yield as well as in enhancing the crop physiological characteristics etc. Thus, it has been observed that the compositions of the present invention, demonstrate enhanced, efficacious and superior behavior in the fields at reduced dosage.

From the foregoing, it will be observed that numerous modifications and variations is effectuated without departing from the true spirit and scope of the novel concepts of the present invention. It is to be understood that no limitation with respect to the specific embodiments illustrated is intended or should be inferred.

A. PREPARATION EXAMPLES

The following examples illustrate the basic methodology and versatility of the composition of the invention. It should be noted that this invention is not limited to these exemplifications and is extrapolated to overall claimed concentration range of the components.

Example 1: Wettable Powder Formulation of 90% Elemental Sulphur, 3% Fluxapyroxad and 1% Prothioconazole Wettable powder formulation was prepared by mixing 1 part of prothioconazole, 3 parts of fluxapyroxad, 90 parts of sulphur, 1.5 parts of sodium lauryl sulphate and 4 parts of sodium lignin sulphonate and 0.5 parts of clay in a mass mixer for 30 minutes and then passed through an air jet mill to get the wettable powder composition with desired particle size.

The composition had average particle size of about 10 microns. The composition had a suspensibility of 76%, wettability of less than 20 seconds. The composition further demonstrated suspensibility of about 71% and wettability of about 22 seconds under accelerated storage condition.

Example 2: Wettable Powder Formulation of 30% Elemental Sulphur, 25% Fluxapyroxad and 20% Prothioconazole Wettable powder formulation was prepared by mixing 20 part of prothioconazole, 25 parts of fluxapyroxad, 30 parts of sulphur, 2 parts of Geropon® T77, 3 parts of Geropon® SC 213, 3 parts of calcium lignin sulphonate, and 17 parts of clay were then blended in a mass mixer for 30 minutes and then passed through an air jet mill to get the wettable powder composition with desired particle size.

The composition had average particle size of about 6.7 microns. The composition had a suspensibility of 82%, wettability of less than 11 seconds. The composition further demonstrated suspensibility of about 78% and wettability of about 15 seconds under accelerated storage condition.

Example 3: Wettable Powder Formulation of 40% Elemental Sulphur, 5.3% Fluxapyroxad and 5.1% Prothioconazole Wettable powder formulation was prepared by mixing 5.1 part of prothioconazole, 5.3 parts of fluxapyroxad, 40 parts of sulphur, 2 parts of alkyl naphthalene sulphonate condensate, 3 parts of Morwet® D450, 3 parts of Tamol® DN, 41.6 parts of soapstone in a mass mixer for 30 minutes and then passed through an air jet mill to get the wettable powder composition with desired particle size.

The composition had average particle size of about 12.6 microns. The composition had a suspensibility of 69%, wettability of less than 6 seconds. The composition further demonstrated suspensibility of about 67% and wettability of about 7 seconds under accelerated storage condition.

Example 4: Water Dispersible Granule of 80% Elemental Sulphur, 1.5% Fluxapyroxad and 1% Prothioconazole Water dispersible granules were prepared by taking water in a beaker and surfactants including 5 part of alkylnaphthalenesulfonate condensate, 8 parts of lignin sulphonate sodium, 4.5 parts of clay were added to the beaker one after the other and stirred till the surfactants dissolved completely. Further 80 parts of sulphur was added and stirred to disperse well. Thereafter 1.5 parts of fluxapyroxad and 1 part of prothioconazole was added one after other and mixed using a homogenizer for 15 minutes to obtain a slurry. The slurry was then passed through a wet mill to obtain the desired particle size range. The milled slurry was then spray dried using a suitable spray drying equipment. The composition had an average particle size of about 7.2 microns and granule size of 0.1 mm to 2.5 mm.

The composition disperses almost instantaneously and has a dispersibility of 94%, suspensibility of 88%, wettability of less than 11 seconds and wet sieve retention value of 0.09%. The composition further demonstrated dispersibility of 92%, wettability of less than 9 seconds and suspensibility of about 85% under accelerated storage condition. The composition does not exhibit any hardness.

Example 5: Water Dispersible Granule of 40% Elemental Sulphur, 5.3% Fluxapyroxad and 5.1% Prothioconazole Water dispersible granules were prepared by taking water in a beaker and surfactants including 5 part of polycarboxylate potassium, 5 parts of reax 88A, 10 parts of lactose and 29.6 parts of clay were added to the beaker one after the other and stirred till the surfactants dissolved completely. Further 40 parts of sulphur was added and stirred to disperse well. Thereafter 5.3 parts of fluxapyroxad and 5.1 part of prothioconazole was added one after other and mixed using a homogenizer for 15 minutes to obtain a slurry. The slurry was then passed through a wet mill to obtain the desired particle size range. The milled slurry was then spray dried using a suitable spray drying equipment. The composition had an average particle size of about 5.3 microns and granule size of 0.05 mm to 1.5 mm.

The composition disperses almost instantaneously and has a dispersibility of 98%, suspensibility of 96%, wettability of less than 7 seconds and wet sieve retention value of 0.08%. The composition further demonstrated dispersibility of 95%, wettability of less than 9 seconds and suspensibility of about 95% under accelerated storage condition. The composition does not exhibit any hardness.

Example 6: Water Dispersible Granule of 30% Elemental Sulphur, 2% Fluxapyroxad and 20% Prothioconazole Water dispersible granules were prepared by taking water in a beaker and surfactants including 2 part of supragil WP, 5 parts of Stepserse DF 500, 12 parts of sodium citrate and 29 parts of clay were added to the beaker one after the other and stirred till the surfactants dissolved completely. Further 30 parts of sulphur was added and stirred to disperse well. Thereafter 2 parts of fluxapyroxad and 20 part of prothioconazole was added one after other and mixed using a homogenizer for 15 minutes to obtain a slurry. The slurry was then passed through a wet mill to obtain the desired particle size range. The milled slurry was then spray dried using a suitable spray drying equipment. The composition had an average particle size of about 6 microns and granule size of 0.1 mm to 2.5 mm.

The composition disperses almost instantaneously and has a dispersibility of 99%, suspensibility of 99%, wettability of less than 7 seconds and wet sieve retention value of 0.08%. The composition further demonstrated dispersibility of 99%, wettability of less than 8 seconds and suspensibility of about 97% under accelerated storage condition. The composition does not exhibit any hardness.

Example 7: Wettable Powders for Slurry Seed Treatment (WS) Formulation of 85% Elemental Sulphur, 3% Fluxapyroxad and 3% Prothioconazole WS formulation was prepared by mixing 3 part of prothioconazole, 3 parts of fluxapyroxad, 85 parts of sulphur, 4 parts of naphthalene sulphonate, 2 parts sticker, 1 part of Morwet EFW and 2 parts of pigment violet in a mass mixer for 30 minutes and then passed through an air jet mill to get the Water dispersible powders for slurry seed treatment composition with desired particle size.

The composition had average particle size of about 6.5 microns. The composition had a suspensibility of 82.89%, wettability of less than 20 seconds. The composition further demonstrated suspensibility of about 81.42% and wettability of about 26 seconds under accelerated storage condition.

Example 8: Dustable Powder Formulation of 40% Elemental Sulphur, 5.3% Fluxapyroxad and 5% Prothioconazole Dustable powder formulation was prepared by mixing 5.1 part of prothioconazole, 5.3 parts of fluxapyroxad, 40 parts of sulphur in a mass mixer followed by addition of talc (q.s) and mixed to obtain uniform blend. The obtained blend is then passed through a jet mill to get the dustable powder composition with desired particle size.

The composition had a dry sieve retention value on a 75-micron sieve of less than 0.5% and less than 0.52% under accelerated storage condition.

Example 9: Granules (GR) of 40% Elemental Sulphur, 5.3% Fluxapyroxad and 5.1% Prothioconazole GR formulation was prepared by mixing 5.1 part of prothioconazole, 5.3 parts of fluxapyroxad, 40 parts of sulphur, 3 parts of naphthalene sulphonate condensate, 1.5 parts of polyvinyl pyrrolidone, 4.3 parts of sodium sulphate in a mass mixer for 30 minutes and then passed through an air jet mill to get the wettable powder. Wet the obtained powder using water and add kaolin (sufficient quantity) to get wet mass which is then passed through extruder to obtain wet extrudate. The extrudate is then spheronised using a spheronizer to obtain spherical granules. The granules are dried in a fluid bed dryer to obtain granules of 40% elemental sulphur, 5.3% Fluxapyroxad and 5.10% prothioconazole.

The composition had average particle size of about 23.2 microns and granule size of 5-6 mm. The composition has disintegration time of 25 minutes. The composition further demonstrated average particle size of about 24 microns and disintegration time of 31 minutes under accelerated storage condition.

Example 10: Granules (GR) of 30% Elemental Sulphur, 5.3% Fluxapyroxad and 5.1% Prothioconazole GR formulation was prepared by mixing 5.1 part of prothioconazole, 5.3 parts of fluxapyroxad, 30 parts of sulphur, 3 parts of naphthalene sulphonate condensate, 1.5 parts of polyvinyl pyrrolidone, 4.3 parts of sodium sulphate in a mass mixer for 30 minutes and then passed through an air jet mill to get the wettable powder. Wet the obtained powder using water and add kaolin (sufficient quantity) to get wet mass which is then passed through extruder to obtain wet extrudate. The extrudate is then spheronised using a spheronizer to obtain spherical granules. The granules are dried in a fluid bed dryer to obtain granules of 40% elemental sulphur, 5.3% Fluxapyroxad and 5.1% prothioconazole.

The composition had average particle size of about 23 microns and granule size of 5-6 mm. The composition has disintegration time of less than 5 minutes. The composition further demonstrated average particle size of about 24 microns and disintegration time of 5 minutes under accelerated storage condition.

Example 11: Water Disintegrable Tablet of 40% Elemental Sulphur, 5.3% Fluxapyroxad and 5.1% Prothioconazole Water disintegrable tablet formulation was prepared by mixing 5.1 part of prothioconazole, 5.3 parts of fluxapyroxad, 40 parts of sulphur in a mass mixer for 3 minutes. The mixture was then milled (jet mill), wherein the particles in the mixture had size of less than 50 microns. The milled mixture was mixed with mannitol (q.s) (direct compression grade), followed by mixing with 2 parts of sodium naphthalene sulphonate condensate, 3 parts of naphthalene sulphonate, 5 parts of croscarmellose sodium, 0.1 parts of colloidal silicon dioxide, 3 parts of polyvinyl pyrrolidone. Further, 0.5 parts of magnesium stearate was added and mixed for 5 minutes to obtain blend. The obtained blend is compressed into tablets.

The composition had a wet sieve retention value on a 75-micron sieve of less than 0.2%. The composition has suspensibility of 75% and persistent foam of 10 ml. Further, the composition had a wet sieve retention value on a 75-micron sieve of less than 0.23%, suspensibility of 68% and persistent foam of 11 ml under accelerated storage condition.

Example 12: Suspension Concentrate Composition of 55% Elemental Sulphur, 1.5% Fluxapyroxad and 1% Prothioconazole Suspension concentrate composition was prepared by taking water (quantity sufficient) in a beaker and adding 5 parts of glycerol, 3 parts of silicone alcohol ethoxylate, 3 parts of powerblox SN, 0.1 parts of benzisothiazolinone, 0.2 part of antifoam agent. The components were mixed well to obtain a mixture and 55 parts of elemental sulphur, 1.5 parts of Fluxapyroxad and 1 part of prothioconazole were added to the mixture. The resulting mixture was stirred well and milled to get desired particle size. Then, 0.12 parts of xanthan gum was added under continuous homogenization to obtain the suspension concentrate.

The resulting formulation had an average particle size of 3.3 microns, suspensibility of 96%. The composition has a viscosity of about 520 cps. The composition has suspensibility of about 95% and viscosity of about 340 cps under accelerated storage condition.

Example 13: Suspension Concentrate Composition of 40% Elemental Sulphur, 5.3% Fluxapyroxad and 5.1% Prothioconazole Suspension concentrate composition was prepared by taking water (quantity sufficient) in a beaker and adding 3 parts of calcium chloride, 3.5 parts of Soprophor FL, 2.5 parts of Morwet D425, 0.3 parts of potassium sorbate, 0.11 parts of antifoam agent. The components were mixed well to obtain a mixture and 40 parts of elemental sulphur, 5.3 parts of Fluxapyroxad and 5.1 part of prothioconazole were added to the mixture. The resulting mixture was stirred well and milled to get desired particle size. Then, 0.14 parts of xanthan gum was added under continuous homogenization to obtain the suspension concentrate.

The resulting formulation had an average particle size of 4.1 microns, suspensibility of 94%. The composition has a viscosity of about 610 cps. The composition has suspensibility of about 91% and viscosity of about 585 cps under accelerated storage condition.

Example 14: Suspension Concentrate Composition of 30% Elemental Sulphur, 5% Fluxapyroxad and 20% Prothioconazole Suspension concentrate composition was prepared by taking water (quantity sufficient) in a beaker and adding 2 parts of sodium lactate, 3 parts of Soprophor 3D33, 3 parts of Teresperse 2020, 0.75 parts of silica, precipitated, 0.17 parts of antifoam agent. The components were mixed well to obtain a mixture and 30 parts of elemental sulphur, 5 parts of Fluxapyroxad and 20 part of prothioconazole were added to the mixture. The resulting mixture was stirred well and milled to get desired particle size. Then, 0.1 parts of xanthan gum was added under continuous homogenization to obtain the suspension concentrate.

The resulting formulation had an average particle size of 4.8 microns, suspensibility of 98%. The composition has a viscosity of about 550 cps. The composition has suspensibility of about 96% and viscosity of about 560 cps under accelerated storage condition.

Example 15: Suspoemulsion Composition of 30% Elemental Sulphur, 5% Fluxapyroxad and 3.5% Prothioconazole To a sufficient quantity of water in a beaker, 5 parts of glycerol, 1 part of polyacrylate surfactant, 3.8 parts of polysorbate 20, 0.1-part Benzisothiazolinone and 0.16 parts of antifoam agent was added to obtain a mixture. 30 parts of sulphur and 5 parts of fluxapyroxad were then added to the mixture and the suspension obtained was uniformly mixed using a homogenizer and then passed through a wet mill to get the desired particle size range. In another beaker, to 20 parts of xylene 3.2 parts of linear alkylbenzesulfonate were mixed together and 3.5 parts of prothioconazole was then added and stirred till it dissolved. This solution was added to the milled sulphur suspension and homogenized. Further 0.12 parts of xanthan gum was added to get the desired viscosity.

The composition has average particle size of about 3.2 microns, pourability of about 2.7%, complete initial and 24-hour dispersion stability. Further, the composition has particle size of about 3.4 microns, pourability of about 3.5%, complete initial and 24-hour dispersion stability under accelerated storage condition.

Example 16: Suspension Concentrate for Seed Treatment (FS) Composition of 40% Elemental Sulphur, 5.3% Fluxapyroxad and 5.1% Prothioconazole FS composition was prepared by taking water (quantity sufficient) in a beaker and adding 6 parts of humectant B70, 3.5 parts of Soprophor FL, 2.5 parts of Morwet D425, 0.3 parts of potassium sorbate, 2.5 parts of agrocer red 112, 0.18 parts of antifoam agent. The components were mixed well to obtain a mixture and 40 parts of elemental sulphur, 5.3 parts of Fluxapyroxad and 5.1 part of prothioconazole were added to the mixture. The resulting mixture was stirred well and milled to get desired particle size. Then, 0.14 parts of xanthan gum was added under continuous homogenization to obtain the FS composition.

The resulting formulation had an average particle size of 8.4 microns, suspensibility of 91.4%. The composition has a viscosity of about 564 cps. The composition has suspensibility of about 88.9%, average particle size of 8.7 microns and viscosity of about 593 cps under accelerated storage condition.

A. Field Study:

Field Trial 1: To Study Effect of Elemental Sulphur, Fluxapyroxad and Prothioconazole Against Powdery Mildew in Cucumber.

The field trials were carried out to study the effect of the composition of elemental sulphur, fluxapyroxad and prothioconazole against Powdery Mildew in Cucumber.

The trial was carried out by Randomized Block Design (RBD) with Thirteen treatments including untreated control, replicated four times. The test product sample, sulphur, prothioconazole, fluxapyroxad alone and in combination in prescribed dosages were applied at foliar application. The cucumber in trial field was raised following good agricultural practice.

Details of Experiment

| | |
|---|---|
| Trial location | Indore, MP |
| Crop: | Cucumber |
| Trial Design | RBD, 04 replications |
| Date of sowing | 11 Jul. 2021 |
| Type of application | Foliar application at 3-5% diseases incidence |
| Water volume used: | 500 L/ha |
| Date of application | 18 Oct. 2021 & 28 Oct. 2021 |
| Time of application | Early in the morning |
| Target Pathogen | Powdery mildew (*Erysiphe cichoracearum*) |
| Plot size | 5 m × 6 m = 30 sq. m |
| Assessment | Disease severity Index |
| Yield | At harvest |

The observation on crop damage caused by Powdery mildew (*Erysiphe cichoracearum*) were recorded Nov. 8, 2021 was at 10 days interval after $2^{nd}$ application (10DAA2SP) after planting of the cucumber plant from each plot and the percentage control was calculated using following formula:

$$\text{Control (\%)} = [\text{Damage in control plot} - \text{Damage in treated plot})/\text{Damage in control plot}] \times 100$$

The mean data on control against the fungus along with the cucumber yield was recorded at harvest and is presented in the Tables 1-3.

"Synergy" is as defined by Colby S. R. in an article entitled "Calculation of the synergistic and antagonistic responses of herbicide combinations" published in Weeds, 1967, 15, p. 20-22. The action expected for a given combination of two active components is calculated as follows:

$$E = X + Y - (XY/100)$$

Where,

E=Expected % effect by mixture of two products X and Y in a defined dose.

X=Observed % effect by product A

Y=Observed % effect by product B

The action expected for a given combination of three active components is calculated as follows:

$$E = (X + Y + Z) - (XY + YZ + XZ/100) + (XYZ/10000)$$

Where,

E=Expected % effect by mixture of three products X, Y and Z in a defined dose.

X=Observed % effect by product A

Y=Observed % effect by product B

Z=Observed % effect by product C

The synergy factor (SF) is calculated by Abbott's formula (Eq. (2)(Abbott, 1925).

SF=Observed effect/Expected effect

Where, SF>1 for Synergistic reaction; SF<1 for antagonistic reaction; SF=1 for additive reaction.

When the percentage of yield effect observed (E) for the combination is greater than the expected percentage, synergistic effect of the combination is inferred. When the percentage of yield effect observed for the combination is equal to the expected percentage, merely an additive effect may be inferred, and wherein the percentage of yield effect observed for the combination is lower than the expected percentage, an antagonistic effect of the combinations is inferred.

TABLE 1

Effect of WG composition comprising elemental sulphur, fluxapyroxad and prothioconazole for controlling powdery Mildew in Cucumber

| Treatment No. | Composition | Active ingredient (g.a.i/ha) Sulphur | Fluxapyroxad | Prothioconazole | % Mean Disease Index (PDI) (Observed at (10DAA2SP)) | % Reduction of disease over control | Yield (Qtl/ha) | % Increase in yield over control |
|---|---|---|---|---|---|---|---|---|
| T1 | Sulphur 40% + Fluxapyroxad 5.3% + Prothioconazole 5.1% WG @ 3750 g/ha according to an embodiment of the present invention. | 1500 | 199 | 191 | 1.7 | 92 *(78.94) | 159 | 77 *(42.54) |

TABLE 1-continued

Effect of WG composition comprising elemental sulphur, fluxapyroxad and prothioconazole for controlling powdery Mildew in Cucumber

| Treatment No. | Composition | Active ingredient (g.a.i/ha) Sulphur | Fluxapyroxad | Prothioconazole | % Mean Disease Index (PDI) (Observed at (10DAA2SP)) | % Reduction of disease over control | Yield (Qtl/ha) | % Increase in yield over control |
|---|---|---|---|---|---|---|---|---|
| T2 | Sulphur 80% WDG @1875 g/ha | 1500 | — | — | 13 | 41 | 109 | 21 |
| T3 | Fluxapyroxad 26.55% SC @ 750 g/ha | — | 199 | — | 11.1 | 50 | 106 | 18 |
| T4 | Prothioconazole 25% EC @ 764 g/ha | — | — | 191 | 15 | 32 | 101 | 12 |
| T5 | Sulphur 50% + Fluxapyroxad 15% + Prothioconazole 14.5% WG @ 1325 g/ha according to an embodiment of the present invention. | 662.5 | 199 | 191 | 1.4 | 94 *(82.34) | 150.00 | 67 *(50.21) |
| T6 | Sulphur 80% WDG @828 g/ha | 662.5 | — | — | 10.8 | 51 | 118.00 | 31 |
| T7 | Fluxapyroxad 26.55% SC @ 750 g/ha | — | 199 | — | 11.1 | 50 | 106 | 18 |
| T8 | Prothioconazole 25% EC @ 764 g/ha | — | — | 191 | 15 | 32 | 101 | 12 |
| T9 | Sulphur 90% + Fluxapyroxad 2.43% + Prothioconazole 2.34% WG @ 8200 g/ha according to an embodiment of the present invention. | 7380 | 199 | 192 | 1.2 | 95 *(84) | 150 | 67 *(50) |
| T10 | Sulphur 80% WDG @9225 g/ha | 7380 | — | — | 10 | 55 | 118 | 31 |
| T11 | Fluxapyroxad 26.55% SC @ 750 g/ha | — | 199 | — | 11.1 | 50 | 106 | 18 |
| T12 | Prothioconazole 25% EC @ 764 g/ha | — | — | 192 | 15 | 32 | 101 | 12 |
| T13 | Untreated check | NA | NA | NA | 22 | — | 90 | 0 |

WG: Water dispersible granule;
*Synergy calculation,
10DAA2SP: 10 days interval after 2$^{nd}$ application It is seen from table 1 that the application of Treatment 1 (T1) with Sulphur 40%+Fluxapyroxad 5.3%+Prothioconazole 5.1% WG @3750 g/ha as per the embodiment of present invention, Treatment 5 (T5) with Sulphur 50%+ Fluxapyroxad 15%+Prothioconazole 14.5% WG @1325 g/ha as per the embodiment of present invention; and Treatment 9 (T9) with Sulphur 90%+Fluxapyroxad 2.43%+ Prothioconazole 2.34% WG @8200 g/ha as per the embodiment of present invention were highly effective in controlling the powdery mildew disease in cucumber after application as compared to the individual treatments of sulphur (T2, T6, T10), fluxapyroxad (T3, T7 and T11) and prothioconazole (T4, T8 and T12). It is seen that Treatments T1, T5 and T9 showed 92%, 94% and 95% respectively reduction in disease over the untreated control and showed better reduction of the fungal disease as compared to individual treatments with sulphur, fluxapyroxad and prothioconazole. The surprising synergistic result of treatments T1, T5 and T9 is attributed to the composition of sulphur, fluxapyroxad and prothioconazole as per the embodiments of the invention, where all three actives are present in a single composition at a specific concentration. The enhanced efficacy is further attributed to the form of the composition, i.e. water dispersible composition as shown in the present study, which includes particles in the size range of 0.1 micron to 50 microns.

Further, the composition as per the embodiment of the present invention, on account of significant control of the fungus and due to the presence of sulphur in the composition, not only assists in controlling the fungi, but also additionally provides nutrition to the plant, thus showing a significant enhancement in the yield as well as other crop characteristics such as plant height, root length and improved foliage, as compared to the yield observed with individual applications of sulphur, fluxapyroxad and prothioconazole.

TABLE 2

Effect of synergistic combinations of elemental sulphur, fluxapyroxad and prothioconazole formulated as WP, SC, GR, SE for controlling powdery Mildew in Cucumber

| Treatment No. | Composition | Active ingredient (g.a.i/ha) Sulphur | Fluxapyroxad | Prothioconazole | % Mean Disease Index (PDI) (Observed at 10DAA2SP) | % Reduction of disease over control | Yield (Qtl/ha) | % Increase in yield over control |
|---|---|---|---|---|---|---|---|---|
| T1 | Sulphur 90% + Fluxapyroxad 3% + Prothioconazole 2.87% WP @ 6650 g/ha according to an embodiment of the present invention. | 5985 | 199 | 191 | 1.20 | 93 *(82) | 144 | 69 *(51%) |
| T2 | Sulphur 80% WDG @7480 g/ha | 5985 | — | — | 12 | 33 | 108 | 27 |
| T3 | Fluxapyroxad 26.55% SC @ 750 g/ha | — | 199 | — | 8 | 56 | 102 | 20 |
| T4 | Prothioconazole 25% EC @ 764 g/ha | — | — | 191 | 11 | 39 | 98 | 15 |
| T5 | Sulphur 40% + Fluxapyroxad 5.3% + Prothioconazole 5.1% SC @ 3750 g/ha according to an embodiment of the present invention. | 1500 | 199 | 191 | 1.5 | 92 *(82) | 136 | 60 *(42) |

TABLE 2-continued

Effect of synergistic combinations of elemental sulphur, fluxapyroxad and prothioconazole formulated as WP, SC, GR, SE for controlling powdery Mildew in Cucumber

| Treatment No. | Composition | Active ingredient (g.a.i/ha) Sulphur | Fluxapyroxad | Prothioconazole | % Mean Disease Index (PDI) (Observed at 10DAA2SP) | % Reduction of disease over control | Yield (Qtl/ha) | % Increase in yield over control |
|---|---|---|---|---|---|---|---|---|
| T6 | Sulphur 80% WDG @1875 g/ha | 1500 | — | — | 11 | 39 | 103 | 21 |
| T7 | Fluxapyroxad 26.55% SC @ 750 g/ha | — | 199 | — | 7.3 | 59 | 98 | 15 |
| T8 | Prothioconazole 25% EC @ 764 g/ha | — | — | 191 | 13.2 | 27 | 96 | 13 |
| T9 | Sulphur 50% + Fluxapyroxad 20.45% + Prothioconazole 19.7% GR @ 975 g/ha according to an embodiment of the present invention. | 487 | 199 | 192 | 2.4 | 87 *(81) | 124 | 46 *(35) |
| T10 | Sulphur 80% WDG @609 g/ha | 487 | — | — | 14 | 22 | 99 | 16 |

| Treatment No. | Composition | Active ingredient (g.a.i/ha) Sulphur | Fluxapyroxad | Prothioconazole | % Mean Disease Index (PDI) (Observed at 10DAA2SP) | % Reduction of disease over control | Yield (Qtl/ha) | % Increase in yield over control |
|---|---|---|---|---|---|---|---|---|
| T11 | Fluxapyroxad 26.55% SC @ 750 g/ha | — | 199 | — | 10 | 44 | 94 | 11 |
| T12 | Prothioconazole 25% EC @ 764 g/ha | — | — | 192 | 8 | 56 | 96 | 13 |
| T13 | Sulphur 30% + Fluxapyroxad 1.66% + Prothioconazole 1.6% SE @ 12000 g/ha according to an embodiment of the present invention. | 3600 | 199 | 192 | 1.1 | 94 *(88) | 130 | 53 *(34) |
| T14 | Sulphur 80% WDG @4500 g/ha | 3600 | — | — | 11 | 39 | 99 | 16 |
| T15 | Fluxapyroxad 26.55% SC @ 750 g/ha | — | 199 | — | 7 | 61 | 95 | 12 |
| T16 | Prothioconazole 25% EC @ 764 g/ha | — | — | 192 | 9 | 50 | 94 | 11 |
| T17 | Untreated check | NA | NA | NA | 18 | — | 85 | 0 |

WP: Wettable Powder;

SC: Suspension Concentrate;

GR: Granule;

SE: Suspoemulsion;

*Synergy calculation;

10DAA2SP: 10 days interval after 2nd application

It is seen from table 2 that the application of Treatments T1, T5, T9 and T13 with combinations of Sulphur, Fluxapyroxad and Prothioconazole in various formulation types prepared as per the embodiment of present invention were highly effective in controlling the powdery mildew disease in cucumber after application as compared to the individual treatments of sulphur (T2, T6, T10, T14), fluxapyroxad (T3, T7, T11, T15) and prothioconazole (T4, T8, T12, T16). The surprising synergistic result of treatments T1, T5, T9 and T13 is attributed to the composition of sulphur, fluxapyroxad and prothioconazole as per the embodiments of the invention, where all three actives are present in a single composition at a specific concentration. The enhanced efficacy is further attributed to the form of the composition, i.e. WP, SC, GR, SE as shown in the present study, which includes particles in the size range of 0.1 micron to 50 microns.

Further, the composition as per the embodiment of the present invention, on account of significant control of the fungus and due to the presence of sulphur in the composition, not only assists in controlling the fungi, but also additionally provides nutrition to the plant, thus showing a significant enhancement in the yield as well as other crop characteristics such as plant height, root length and improved foliage, as compared to the yield observed with individual applications of sulphur, fluxapyroxad and prothioconazole.

TABLE 3

Comparison of synergistic effect of composition comprising elemental sulphur, fluxapyroxad and prothioconazole; known 2-way combinations of actives and individual actives for controlling powdery Mildew in Cucumber

| Treatment No. | Composition | Active ingredient (g.a.i/ha) Sulphur | Fluxapyroxad | ProthioConazole | % Mean Disease Index (PDI) (observed at 10DAA2SP) | % Reduction of disease over control | Yield (Qtl/ha) | % Increase in yield over control | Crop Phytoxicity |
|---|---|---|---|---|---|---|---|---|---|
| T1 | Sulphur 40% + Fluxapyroxad 5.3% + Prothioconazole 5.1% WG @ 3750 g/ha according to an embodiment of the present invention. | 1500 | 199 | 191 | 1.7 | 92 *(79.94) | 159 | 77 *(42.99) | 0 |
| T2 | Sulphur 40% + Fluxapyroxad 5.3% WG @ 3750 g/ha (combination as per prior art) | 1500 | 199 | — | 6.8 | 69 | 119 | 32 | 0 |
| T3 | Fluxapyroxad 5.3% + Prothioconazole 5.1% WG @ 3750 g/ha | — | 199 | 191 | 8 | 64 | 112 | 24 | 0 |
| T4 | Sulphur 40% + Prothioconazole 5.1% WG @ 3750 g/ha | 1500 | — | 191 | 7.9 | 64 | 120 | 33 | 0 |
| T5 | Sulphur 80% WDG @1875 g/ha | 1500 | — | — | 13 | 41 | 109 | 21 | 0 |
| T6 | Fluxapyroxad 26.55% SC @ 750 g/ha | — | 199 | — | 11.1 | 50 | 106 | 18 | 0 |
| T7 | Prothioconazole 25% EC @ 764 g/ha | — | — | 191 | 15 | 32 | 101 | 12 | 0 |
| T8 | Untreated check | NA | NA | NA | 22 | 0 | 90 | 0 | 0 |

WG: Water Dispersible granule;

*Synergy calculation; Crop Phytoxocity:

0 = No virus disease on leaf and plant;

1 = <1% leaf & plan showed virus disease;

10DAA2SP: 10 days interval after 2nd applicpation

It is seen from table 3 that the application of Treatments T1 with combination of Sulphur, Fluxapyroxad and Prothioconazole prepared as per the embodiment of present invention was highly effective in controlling the powdery mildew disease in cucumber after application and demonstrated increased yield of cucumber as compared to the two-way combination treatments (T2, T3 and T4), and individual treatments of sulphur (T5), fluxapyroxad (T6) and prothioconazole (T7). The surprising synergistic result of treatment T1 is attributed to the composition of sulphur, fluxapyroxad and prothioconazole as per the embodiments of the invention, where all three actives are present in a single composition at a specific concentration. The enhanced efficacy is further attributed to the form of the composition Water dispersible granules as shown in the present study, which includes particles in the size range of 0.1 micron to 50 microns.

Further, the composition as per the embodiment of the present invention, on account of significant control of the fungus and due to the presence of sulphur in the composition, not only assists in controlling the fungi, but also additionally provides nutrition to the plant, thus showing a significant enhancement in the yield as well as other crop characteristics such as plant height, root length and improved foliage, as compared to the yield observed with individual applications of sulphur, fluxapyroxad and prothioconazole.

Field Trial Data 2: To study the effect of composition comprising elemental sulphur, fluxapyroxad and prothioconazole with a specific particle size for controlling Anthracnose disease in Chili.

The field trials were carried out to study the effect of composition comprising elemental sulphur, fluxapyroxad and prothioconazole with a specific particle size for controlling Anthracnose disease in Chili. The trial was laid out during August to January in Randomized Block Design (RBD) with four treatments including untreated control, replicated five times. The test product sample with specific particle size was compared with untreated control. The treatments were applied as foliar application at 50-70 days after transplanting of Chili in trial plot. The Chili crop was raised in trial field following good agricultural practice.

Details of Experiment a) Trial Location: Guntur, Andhra Pradesh
b) Crop: Chili (Teja variety)
c) Trial Design: RBD
d) Replications: Five
e) Treatment: Four
f) Plot size: 6 m×10 m
g) Date of sowing:20.08.2021
h) Date of Application: 10.10.2021 & 25.10.2021
i) Method of application: Two Foliar applications at 15 days interval
j) Date of Harvesting: 20.1.2022

TABLE 4

Effect of composition comprising elemental sulphur, fluxapyroxad and prothioconazole with a specific particle size for controlling Anthracnose disease in Chili

| Treat-ment No. | Composition | Range of Particle size of the composition | Active ingredient (g.a.i/ha) Sulphur | Fluxapyroxad | Prothioconazole | % Mean Disease Index (PDI) Observed at 10DAA2SP) | % Reduction of disease over control | Yield (Qtl/ha) | % Increase in yield over control |
|---|---|---|---|---|---|---|---|---|---|
| T1 | Sulphur 40% + Fluxapyroxad 5.3% + Prothioconazole 5.1% WG @ 3750 g/ha according to an embodiment of the present invention. | 0.1 to 50 microns | 1500 | 199 | 191 | 1.1 | 94 | 157 | 65 |
| T2 | Sulphur 40% + Fluxapyroxad 5.3% + Prothioconazole 5.1% WG @ 3750 g/ha according to an embodiment of the present invention. | 50 to 100 microns | | | | 5.5 | 69 | 128 | 35 |
| T3 | Sulphur 40% + Fluxapyroxad 5.3% + Prothioconazole 5.1% WG @ 3750 g/ha according to an embodiment of the present invention. | 100 to 150 microns | | | | 6.2 | 66 | 122 | 28 |
| T4 | Untreated check | | NA | NA | NA | 18 | — | 95 | — |

WG: Water Dispersible granule;
10DAA2SP: 10 days interval after 2nd application

It is observed from Table 4, that treatment 1 (T1) having particle size distribution in the range of 0.1 to 50 microns showed improved yield and improved fungicidal effect against Anthracnose disease in Chili as compared to treatment 2 (T2) having particle size range of 50 to 100 microns, and treatment 3 (T3) having particle size distribution in the range of 100 to 150 microns and untreated control.

Further, Treatment 1 having particle size of 0.1 to 50 microns; Treatment 2 having particle size of 50 to 100 microns; and Treatment 3 having particle size of 50 to 100 microns microns applied to Chili crop at a dose of 3750 g/ha, exhibited about 65%, 35% and 28% increase in yield respectively over the control.

Thus, it was surprisingly noted that even amongst the WDG formulations, superior efficacy was observed with WDG formulation having specific particle size distribution of 0.1 to 50 microns in comparison to WDG formulations having different particle sizes in varied ranges.

Field Trial Data 3: To study the effect of composition comprising elemental sulphur, fluxapyroxad and prothioconazole with varying concentration of elemental sulphur in controlling Anthracnose disease in Chili (Sitara variety).

The field trials were carried out to study the effect of composition comprising elemental sulphur, fluxapyroxad and prothioconazole with a specific particle size for controlling Anthracnose disease in Chili. The trial was laid out during August to January in Randomized Block Design (RBD) with four treatments including untreated control, replicated five times. The test product sample was compared with untreated control. The treatments were applied as foliar application at 50-70 days after transplanting of Chili in trial plot. The Chili crop was raised in trial field following good agricultural practice.

Details of Experiment a) Trial Location: Khandwa, Madhya Pradesh
b) Crop: Chili (Sitara Variety)
c) Trial Design: RBD
d) Replications: Five
e) Treatment: Four
f) Plot size: 6 m×10 m
g) Date of sowing:18.08.2021
h) Date of Application: 8.10.2021 & 23.10.2021
i) Method of application: Two Foliar applications at 15 days interval
j) Date of Harvesting: 18.1.2022

TABLE 5

Effect of composition comprising elemental sulphur, fluxapyroxad and prothioconazole with varying concentration of elemental sulphur for controlling Anthracnose disease in Chili

| Treatment No. | Composition | Active ingredient (g.a.i/ha) Sulphur | Fluxapyroxad | Prothioconazole | % Mean Disease Index (PDI) (observed at 10DAA2SP) | Reduction of disease over control | Yield (Qtl/ha) | % Increase in yield over control |
|---|---|---|---|---|---|---|---|---|
| T1 | Sulphur 40% + Fluxapyroxad 5.3% + Prothioconazole 5.1% WG @ 3750 g/ha according to an embodiment of the present invention. | 1500 | 199 | 191 | 1.1 | 94 | 156 | 64 |

TABLE 5-continued

Effect of composition comprising elemental sulphur, fluxapyroxad and prothioconazole with varying concentration of elemental sulphur for controlling Anthracnose disease in Chili

| Treatment No. | Composition | Active ingredient (g.a.i/ha) Sulphur | Fluxapyroxad | Prothioconazole | % Mean Disease Index (PDI) (observed at 10DAA2SP) | Reduction of disease over control | Yield (Qtl/ha) | % Increase in yield over control |
|---|---|---|---|---|---|---|---|---|
| T2 | Sulphur 20% + Fluxapyroxad 5.3% + Prothioconazole 5.1% WG @ 3750 g/ha according to an embodiment of the present invention. | 750 | 199 | 191 | 6 | 67 | 136 | 43 |
| T3 | Sulphur 10% + Fluxapyroxad 5.3% + Prothioconazole 5.1% WG @ 3750 g/ha according to an embodiment of the present invention. | 375 | 199 | 191 | 7.8 | 57 | 132 | 39 |
| T4 | Untreated check | NA | NA | NA | 18 | — | 95 | — |

WG: Water Dispersible granule;
10DAA2SP: 10 days interval after 2nd application

It is observed from Table 5, that treatment 1 (T1) WG of Sulphur 40%+Fluxapyroxad 5.3%+Prothioconazole 5.1% showed better yield and fungicidal effect against Anthracnose disease in Chili (Sitara variety) as compared to treatment 2 (T2) having 20% elemental sulphur, and treatment 3 (T3) having 10% elemental sulphur and untreated control. However, it is noted from the comparative efficacy data, that the composition with less than 30% elemental sulphur does not exhibit the desired result i.e. better control of Anthracnose disease in Chili, and % yield increase when compared to the composition of the present invention.

From the foregoing, it will be observed that numerous modifications and variations is effectuated without departing from the true spirit and scope of the novel concepts of the present invention. It is to be understood that no limitation with respect to the specific embodiments illustrated is intended or should be inferred.

We claim:

1. A pesticidal composition, comprising:

elemental sulphur in a range of 30% w/w to 90% w/w of the pesticidal composition;

fluxapyroxad in a range of 0.01% w/w to 25% w/w of the pesticidal composition;

prothioconazole in a range of 1% w/w to 20% w/w of the pesticidal composition; and at least one agrochemically acceptable excipient;

wherein the pesticidal composition comprises particles having a particle size in a range of 0.1 micron to 50 microns.

2. The pesticidal composition of claim 1, wherein the pesticidal composition is in a form of a solid, a liquid, or a gel.

3. The pesticidal composition of claim 2, wherein the pesticidal composition in the form of the solid and is formulated as granules formed from the particles, and wherein the granules are selected from spheronised granules, extruded granules, water disintegrable granules, wettable powder, water dispersible granules, dustable powder (DP), powder for dry seed treatment (DS), one or more water disintegrable tablets, or water dispersible powders for slurry seed treatment (WS).

4. The pesticidal composition of claim 2, wherein the pesticidal composition in the form of the liquid is in a form of: liquid suspension, suspension concentrate (SC), suspoemulsion (SE), oil dispersion (OD), flowable concentrate (FC), suspension concentrate for seed treatment (FS), or Ultra-Low-Volume (ULV).

5. The pesticidal composition of claim 3, wherein the water dispersible granules are in a size range of 0.05 mm to 3 mm.

6. The pesticidal composition of claim 3, wherein the water dispersible granules are in a size range of 0.05 mm to 6 mm.

7. The pesticidal composition of claim 1, wherein the pesticidal composition further comprises at least one active ingredient selected from: pesticidal actives, fertilizers, macronutrients, micronutrients, biostimulants, organic acids, plant growth regulators, algae, and mixtures thereof.

8. The pesticidal composition of claim 1, wherein the at least one agrochemically acceptable excipient is selected from at least one of: surfactants, binding agents, wetting agents, emulsifiers, fillers, carriers, coating agents, ph adjusters, antifoaming agents, penetrants, UV protecting agents, UV absorbents, UV rays scattering agents, stabilizers, pigments, colorants, structuring agents, complexing agents, thickeners, anticaking agents, viscosity modifiers, tackifiers, humectants, spreading agents, sticking agents, anti-freezing agents, solvents, preservatives, polymers, monomers, cross-linking agents, permeability enhancing agents, protective colloids, and mixtures thereof.

9. A process for preparation of the pesticidal composition of claim 3, wherein the pesticidal composition is in the form of granules, and wherein the form of granules comprises water dispersible granules, the process comprising:

a) milling a blend of the elemental sulphur, the fluxapyroxad, and the prothioconazole in water with the at least one agrochemical excipient to obtain a slurry or a wet mix, such that the slurry or the wet mix has the particle size in the range of 0.1 micron to 50 microns; and b) drying the slurry or the wet mix to form dried mix, and sieving the dried mix to remove undersized and oversized granules to obtain the water dispersible granules;

wherein the water dispersible granules are in a size range of 0.05 mm to 3 mm.

10. A process for preparation of the pesticidal composition of claim 3, wherein the pesticidal composition is in the form of granules, the process comprising:

a) milling a blend of the elemental sulphur, the fluxapyroxad, and the prothioconazole in water with the at least one agrochemical excipient to obtain a slurry or a wet mix, such that the slurry or the wet mix has the particle size in the range of 0.1 micron to 50 microns;

b) drying the slurry or the wet mix to obtain a dry mix; wherein the dry mix comprises granules in a size range of 0.05 mm to 3 mm; and c) either:

i) adding water to the dry mix; blending the dry mix to obtain a dough or a paste; and extruding, through an extruder, the dough or the paste to obtain extruded granules in a size range of 0.05 mm to 6 mm; or ii) agglomerating the wet mix or the dry mix obtained in b) in an agglomerator to obtain the pesticidal composition in the form of granules in a form of spheronised granules in a size range of 0.05 mm to 6 mm.

11. A process for preparation of the pesticidal composition of claim 3, wherein the pesticidal composition is in the form of the wettable powder, the process comprising:

a) mixing the elemental sulphur, the fluxapyroxad, and the prothioconazole with the at least one agrochemical excipient to obtain an obtained mixture;

b) milling the obtained mixture to obtain the pesticidal composition in the form of the wettable powder.

12. A process for preparation of the pesticidal composition of claim 4, wherein the pesticidal composition is in the form of the liquid, and wherein the form of the liquid comprises liquid suspension, the process comprising:

a) homogenizing a mixture of the elemental sulphur, the fluxapyroxad and, the prothioconazole with the at least one agrochemical excipient to obtain an obtained suspension; and b) wet milling the obtained suspension to provide the pesticidal composition in the form of the liquid in the form of the liquid suspension.

13. A process for preparation of the pesticidal composition of claim 4, wherein the pesticidal composition is in the form of the liquid, and wherein the form of the liquid comprises suspoemulsion, the process comprising:

a) homogenizing a mixture of the elemental sulphur and the fluxapyroxad with the at least one agrochemical excipient to obtain an obtained suspension; and wet milling the obtained suspension to provide a suspension concentrate of elemental sulphur and fluxapyroxad with a particle size range of 0.1 micron to 50 microns;

b) dissolving the prothioconazole in oil or solvent with the at least one agrochemically acceptable excipient to obtain an emulsion concentrate of prothioconazole; and c) mixing the suspension concentrate of elemental sulphur and fluxapyroxad and the emulsion concentrate of prothioconazole to obtain the pesticidal composition in the form of the liquid in the form of suspoemulsion.

14. A method of fungal disease control, crop protection, or plant health and yield improvement, the method comprising: treating at least one of a plant, a crop, a plant propagation material, a locus, parts thereof, or a seed, a seedling, or soil with the pesticidal composition of claim 1.

* * * * *